United States Patent
Tseng et al.

(10) Patent No.: US 12,556,792 B2
(45) Date of Patent: Feb. 17, 2026

(54) CAMERA MODULE AND ELECTRONIC DEVICE

(71) Applicant: LARGAN PRECISION CO., LTD., Taichung (TW)

(72) Inventors: Te-Sheng Tseng, Taichung (TW); Yu Chen Lai, Taichung (TW); Ming-Ta Chou, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 178 days.

(21) Appl. No.: 18/138,954

(22) Filed: Apr. 25, 2023

(65) Prior Publication Data

US 2024/0022803 A1  Jan. 18, 2024

Related U.S. Application Data

(60) Provisional application No. 63/388,435, filed on Jul. 12, 2022.

(51) Int. Cl.
*H04N 23/55* (2023.01)
*G02B 5/00* (2006.01)
(Continued)

(52) U.S. Cl.
CPC ............. *H04N 23/55* (2023.01); *G03B 30/00* (2021.01); *H02K 41/0354* (2013.01);
(Continued)

(58) Field of Classification Search
CPC .... H04N 23/55; H04N 23/54; H04N 23/6812; H04N 23/687; H04N 23/57; G03B 30/00; H02K 41/0354; G02B 5/003
See application file for complete search history.

(56) References Cited

U.S. PATENT DOCUMENTS 8,861,946 B2  10/2014  Kim et al.
9,264,618 B2   2/2016  Kim
(Continued)

FOREIGN PATENT DOCUMENTS

CN  105204176 B  2/2018
CN  207380423 U  5/2018
(Continued)

OTHER PUBLICATIONS

Taiwan Office Action dated Apr. 14, 2023 as received in application No. 111127606.
(Continued)

*Primary Examiner* — Albert H Cutler
(74) *Attorney, Agent, or Firm* — Maschoff Brennan

(57) ABSTRACT

A camera module includes an imaging lens, an image sensor, a corner drive mechanism and a side drive mechanism. The image sensor is disposed at an image side of the imaging lens. The image sensor includes a photosensitive surface. The photosensitive surface faces the imaging lens. The photosensitive surface is substantially rectangular. The photosensitive surface is movable close to or away from the imaging lens in a focusing direction, and is movable in a translational direction orthogonal to the focusing direction. The corner drive mechanism is disposed corresponding to a corner of the photosensitive surface. The side drive mechanism is disposed corresponding to a side of the photosensitive surface. One of the corner drive mechanism and the side drive mechanism drives the image sensor to move in the focusing direction, and another one thereof drives the image sensor to move in the translational direction.

20 Claims, 37 Drawing Sheets

(51) Int. Cl.
  *G03B 30/00* (2021.01)
  *H02K 41/035* (2006.01)
  *H04N 23/54* (2023.01)
  *H04N 23/68* (2023.01)

(52) U.S. Cl.
  CPC ......... *H04N 23/54* (2023.01); *H04N 23/6812* (2023.01); *H04N 23/687* (2023.01); *G02B 5/003* (2013.01)

(56) References Cited

U.S. PATENT DOCUMENTS

| | | |
|---|---|---|
| 10,107,987 B2 | 10/2018 | Osaka et al. |
| 10,447,931 B2 | 10/2019 | Hu et al. |
| 10,863,094 B2 | 12/2020 | Sharma et al. |
| 10,924,675 B2 | 2/2021 | Hubert et al. |
| 2015/0116514 A1 | 4/2015 | Kim et al. |
| 2018/0077327 A1* | 3/2018 | Du .................. H04N 23/54 |
| 2020/0120242 A1 | 4/2020 | Wade |
| 2021/0080807 A1 | 3/2021 | Sharma et al. |
| 2021/0409600 A1* | 12/2021 | Le .................. G02B 7/08 |
| 2022/0006958 A1* | 1/2022 | Awazu ............ G02B 27/646 |
| 2022/0094853 A1* | 3/2022 | Xu ................... H04N 23/54 |
| 2023/0007176 A1 | 1/2023 | Wang et al. |
| 2023/0156911 A1* | 5/2023 | Tanaka ......... H01L 23/49838 |
| | | 348/208.11 |

FOREIGN PATENT DOCUMENTS

| | | |
|---|---|---|
| CN | 104570267 B | 9/2018 |
| CN | 106537215 B | 5/2019 |
| CN | 107102497 B | 7/2019 |
| CN | 107529015 B | 12/2019 |
| CN | 110892704 B | 3/2021 |
| TW | 726766 B | 5/2021 |
| TW | 202118720 A | 5/2021 |
| WO | 2021104013 A1 | 6/2021 |
| WO | 2021161976 A1 | 8/2021 |

OTHER PUBLICATIONS

European Search Report dated Dec. 15, 2023 as received in application No. 23171091.4.

Taiwan Office Action dated Dec. 29, 2023 as received in application No. 112122170.

* cited by examiner

CAMERA MODULE AND ELECTRONIC DEVICE

RELATED APPLICATIONS

This application claims priority to U.S. Provisional Patent Application No. 63/388,435, filed on Jul. 12, 2022, which is incorporated by reference herein in its entirety.

BACKGROUND

Technical Field

The present disclosure relates to a camera module and an electronic device, more particularly to a camera module applicable to an electronic device.

Description of Related Art

With the development of semiconductor manufacturing technology, the performance of image sensors has been improved, and the pixel size thereof has been scaled down. Therefore, featuring high image quality becomes one of the indispensable features of an optical system nowadays. Furthermore, due to the rapid changes in technology, electronic devices equipped with optical systems are trending towards multi-functionality for various applications, and therefore the functionality requirements for the optical systems have been increasing.

In general, the drivers in a camera module can drive an imaging lens to move relative to an image sensor in order to achieve the functionality of focusing and image stabilization. However, the driver in the conventional camera module is overly large, and the size of the driver should increase with the weight of the imaging lens, and thus the camera module becomes large and heavy, which runs counter to the expectation of small and light electronic device.

SUMMARY

According to one aspect of the present disclosure, a camera module includes an imaging lens, an image sensor, a corner drive mechanism and a side drive mechanism. The image sensor is disposed at an image side of the imaging lens. The image sensor includes a photosensitive surface. The photosensitive surface faces the imaging lens. The photosensitive surface is substantially rectangular. The photosensitive surface is movable close to or away from the imaging lens in a focusing direction, and is movable in a translational direction orthogonal to the focusing direction. The corner drive mechanism is disposed corresponding to a corner of the photosensitive surface. The side drive mechanism is disposed corresponding to a side of the photosensitive surface. One of the corner drive mechanism and the side drive mechanism drives the image sensor to move in the focusing direction, and another one thereof drives the image sensor to move in the translational direction.

According to another aspect of the present disclosure, a camera module includes an imaging lens, an image sensor, a corner drive mechanism and a side drive mechanism. The image sensor is disposed at an image side of the imaging lens. The image sensor includes a photosensitive surface. The photosensitive surface faces the imaging lens. The photosensitive surface is substantially rectangular. The photosensitive surface is movable close to or away from the imaging lens in a focusing direction and is movable in a translational direction orthogonal to the focusing direction. The corner drive mechanism is disposed corresponding to a corner of the photosensitive surface. The side drive mechanism is disposed corresponding to a side of the photosensitive surface. Each of the corner drive mechanism and the side drive mechanism is a voice coil motor. The corner drive mechanism includes a corner coil, the side drive mechanism includes a side coil, and the corner coil and the side coil are disposed on the same circuit element.

According to another aspect of the present disclosure, a camera module includes an imaging lens, an image sensor, a movable carrier and an elastic protrusion structure. The image sensor is disposed at an image side of the imaging lens, and the image sensor includes a photosensitive surface. The image sensor is disposed on the movable carrier such that the photosensitive surface is movable close to or away from the imaging lens in a focusing direction and is movable in a translational direction orthogonal to the focusing direction. The elastic protrusion structure is configured to provide a collision reduction mechanism for the movable carrier in at least one of the focusing direction and the translational direction.

According to another aspect of the present disclosure, an electronic device includes one of the abovementioned camera modules.

BRIEF DESCRIPTION OF THE DRAWINGS

The disclosure can be better understood by reading the following detailed description of the embodiments, with reference made to the accompanying drawings as follows.

DETAILED DESCRIPTION

Figure 1:
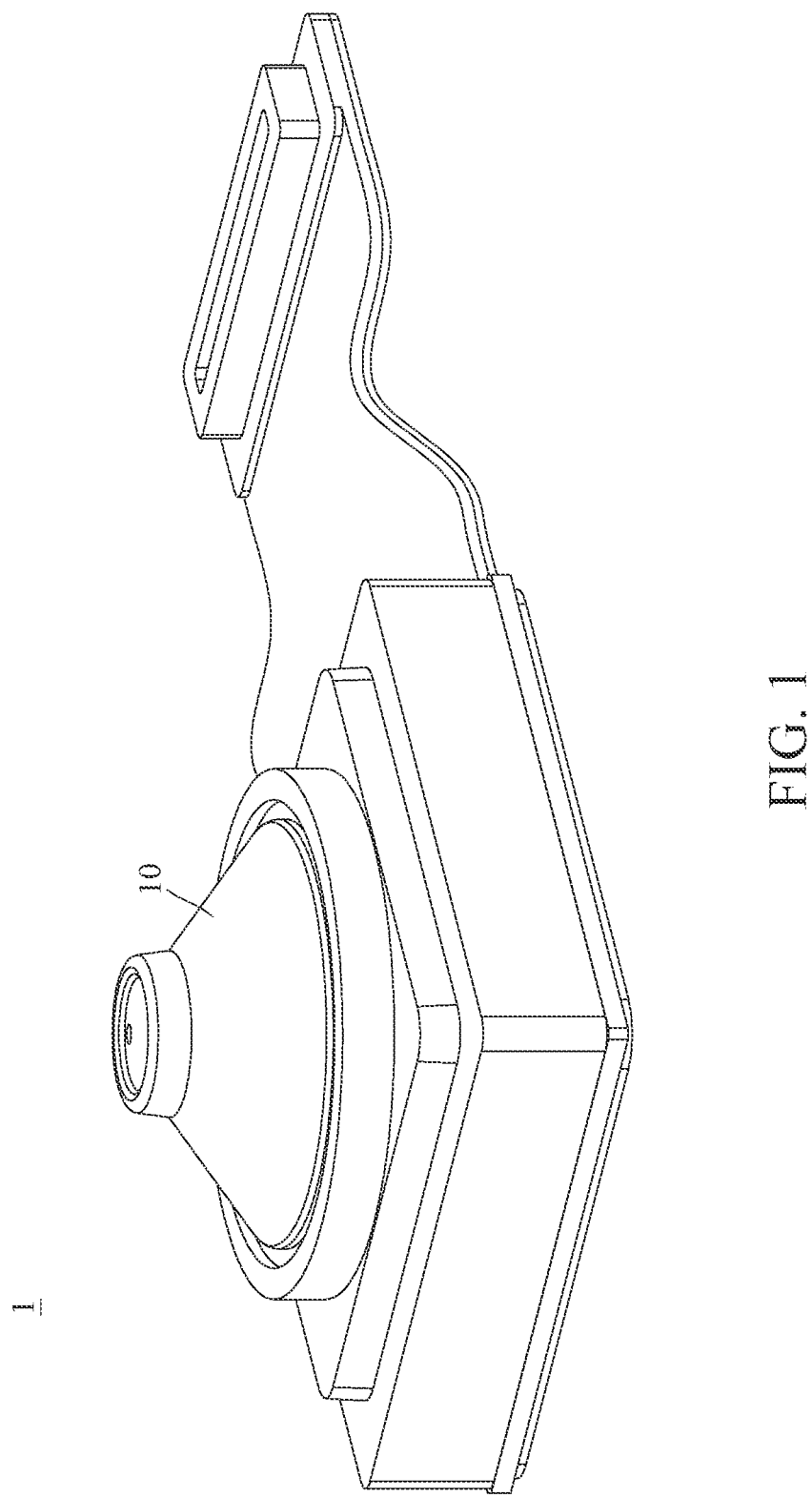
FIG. 1 is a perspective view of a camera module according to the 1st embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

The present disclosure provides a camera module including an imaging lens and an image sensor. The image sensor is disposed at an image side of the imaging lens. The image sensor may include a photosensitive surface facing the imaging lens, and the photosensitive surface is substantially rectangular. The photosensitive surface is movable close to or away from the imaging lens in a focusing direction, and is movable in a translational direction orthogonal to the focusing direction. Moreover, said rectangular photosensitive surface refers to that the photosensitive surface appears to be approximately rectangular, instead of that the photosensitive surface should be geometrically rectangular; for example, in order to match the outline of the imaging lens, corners of the photosensitive surface may be rounded instead of sharped, and sides of the photosensitive surface may be curved instead of straight.

The camera module may further include a corner drive mechanism and a side drive mechanism. The corner drive mechanism is disposed corresponding to a corner of the photosensitive surface. The side drive mechanism is disposed corresponding to a side of the photosensitive surface. One of the corner drive mechanism and the side drive mechanism drives the image sensor to move in the focusing direction, and another one thereof drives the image sensor to move in the translational direction. The corner drive mechanism and the side drive mechanism correspond to the corner and the side of the photosensitive surface, respectively, such that it is favorable for reducing the sizes of the drive mechanisms while preventing mechanical and/or magnetic interference among the drive mechanisms and improving assemblability. Moreover, the focusing direction is further parallel to an optical axis of the imaging lens. Moreover, one of the corner drive mechanism and the side drive mechanism may drive the image sensor to rotate in a rotational direction orthogonal to the focusing direction.

Each of the corner drive mechanism and the side drive mechanism of the camera module may be a voice coil motor (VCM). The corner drive mechanism may include a corner coil, and the side drive mechanism may include a side coil. The corner coil and the side coil may be disposed on the same circuit element. Therefore, it is favorable for reducing interference among the drive mechanisms due to assembly tolerances.

The camera module may further include a movable carrier. The image sensor is disposed on the movable carrier, such that the image sensor is movable close to or away from the imaging lens in the focusing direction, and is movable in the translational direction orthogonal to the focusing direction.

The camera module may further include an elastic protrusion structure. The elastic protrusion structure provides a collision reduction mechanism for the movable carrier in at least one of the focusing direction and the translational direction. Therefore, it is favorable for preventing image shaking caused by a direct collision between the mechanisms so as to ensure image quality. Moreover, the elastic protrusion structure may further provide collision reduction mechanism for the movable carrier in the rotational direction.

The camera module may further include an electrical connection element. The electrical connection element is electrically connected to the image sensor, and the electrical connection element may include a first connection part, a second connection part and a conductive part. The second connection part opposite to the first connection part, and the second connection part is movable in at least one of the focusing direction and the translational direction. The conductive part connects the first connection part to the second connection part, and the conductive part includes a plurality of conductive lines configured for electrical connection between the first connection part and the second connection part in order to transmit image signals from the image sensor. Moreover, the first connection part may be fixed relative to the imaging lens so as to be favorable for tight assembly tolerances. One of the corner drive mechanism and the side drive mechanism may be electrically connected to the electrical connection element so as to be favorable for reducing the number of elements and thus advantageous for miniaturization. Moreover, one of the corner coil of the corner drive mechanism and the side coil of the side drive mechanism may be electrically connected to the electrical connection element.

The camera module may further include a position sensing element, and the position sensing element is configured to detect a position of the image sensor, and the position sensing element is electrically connected to the electrical connection element. Therefore, it is favorable for reducing the number of elements so as to be advantageous for miniaturization.

The corner drive mechanism of the camera module may be disposed adjacent to the side drive mechanism. Therefore, it is favorable for simplifying circuit wiring so as to improve assembly process.

Each of the corner drive mechanism and the side drive mechanism of the camera module may include a drive magnet and a drive coil. The drive magnet and the drive coil are disposed opposite to each other, and one of the drive magnet and the drive coil is fixed relative to the imaging lens. Therefore, it is favorable for tight assembly tolerances so as to enhance control precision and improve image quality. Moreover, at least one of the drive coil of the corner drive mechanism and the drive coil of the side drive mechanism may be fixed relative to the imaging lens.

The corner drive mechanism of the camera module may include a corner magnet, and the side drive mechanism of the camera module may include a side magnet. A direction of a magnetic axis of the corner magnet is non-parallel to a direction of a magnetic axis of the side magnet. Therefore, it is favorable for reducing magnetic field interference.

The movable carrier of the camera module may include a support element. The support element provides support for the movable carrier in the focusing direction, and the support element provides freedom of movement for the movable carrier in the translational direction. Therefore, it is favorable for accomplishing image stabilization functionality. The degree of freedom of movement of the movable carrier provided by the support element may be confined by the elastic protrusion structure. Moreover, the support element may be electrically connected to one of the corner drive mechanism and the side drive mechanism so as to be favorable for reducing the number of elements, and thus advantageous for miniaturization. Moreover, the support element may be a rollable element so as to be favorable for smooth movement. Moreover, the corner drive mechanism and the position sensing element may be grounded via the support element so as to be favorable for simplifying circuit wiring.

The movable carrier of the camera module may include an elastic element, and the elastic element provides freedom of movement for the movable carrier in the focusing direction. Therefore, it is favorable for accomplishing focusing functionality. Moreover, the degree of freedom of movement of the movable carrier, which is provided by the elastic element, may be confined by the elastic protrusion structure. Moreover, the elastic element may be electrically connected to one of the corner drive mechanism and the side drive mechanism so as to be favorable for improving space utilization by reducing the number of elements, and thus advantageous for miniaturization. Moreover, the elastic element may be in physical contact with the image sensor so as to improve thermal conduction.

The movable carrier of the camera module may include a light absorbing surface facing the imaging lens. The elastic protrusion structure may also include a light absorbing surface facing the imaging lens. Therefore, it is favorable for reducing glare caused by light reflection on surfaces of the movable carrier so as to ensure image quality.

The elastic protrusion structure of the camera module may be made of a metallic element, and the metallic element and the movable carrier are formed into one piece by insert molding. Therefore, it is favorable for ensuring normal performance of the elastic protrusion structure.

The camera module may include two corner drive mechanisms, and the two corner drive mechanisms are provided symmetrically. The camera module may include two side drive mechanisms, and the two side drive mechanisms are provided symmetrically. Therefore, it is favorable for preventing tilt of the image sensor so as to ensure required imaging effects.

The elastic protrusion structure of the camera module may be movable only in one of the focusing direction and the translational direction. Therefore, it is favorable for reducing redundant area on the elastic protrusion structure so as to improve weight distribution.

The present disclosure provides an electronic device that preferably includes the abovementioned camera module.

According to the present disclosure, the aforementioned features and conditions can be utilized in numerous combinations so as to achieve corresponding effects.

According to the above description of the present disclosure, the following specific embodiments are provided for further explanation.

1st Embodiment

Figure 2:
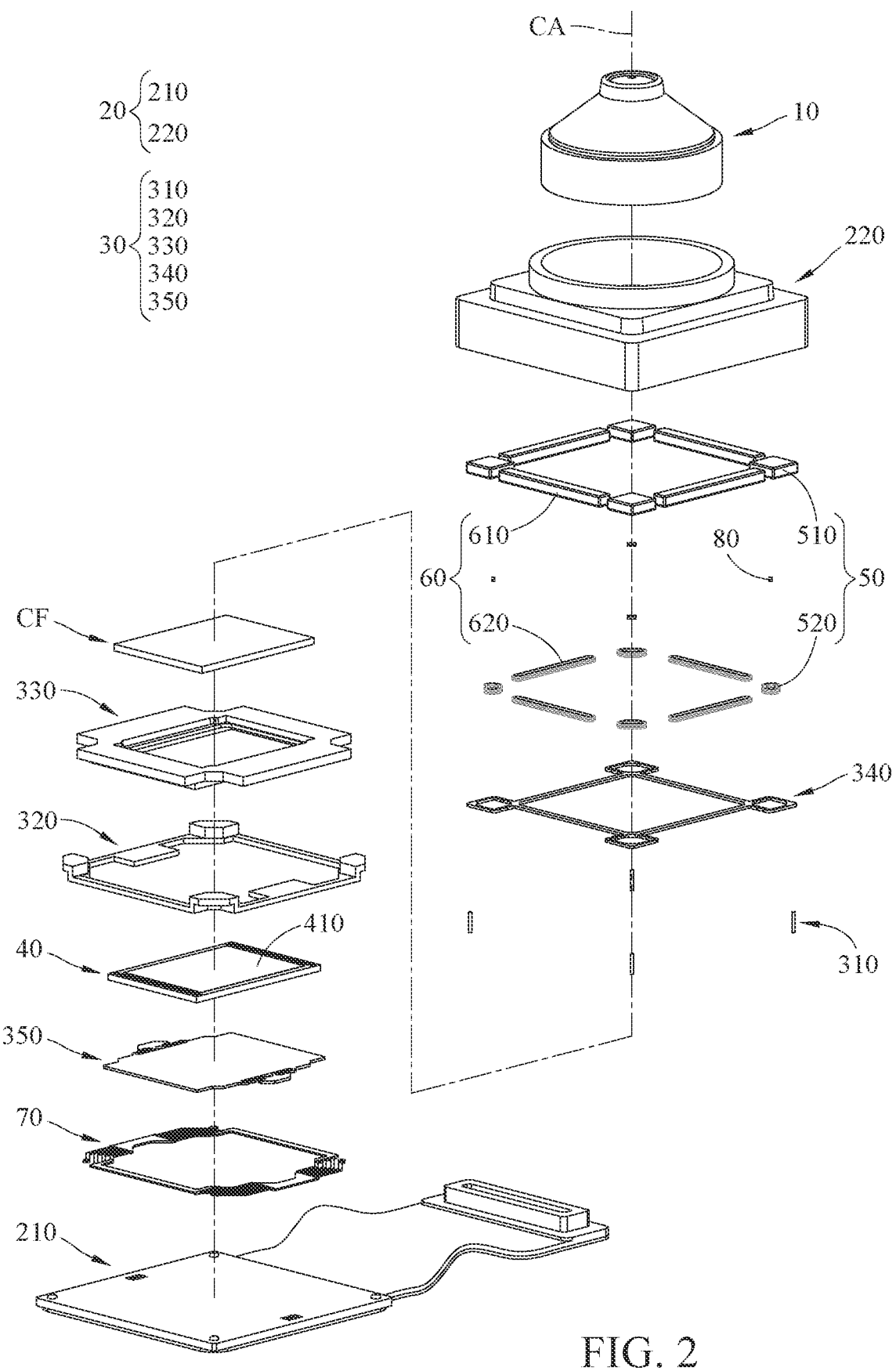
FIG. 2 is an exploded view of the camera module in FIG. 1.
Figure 3:
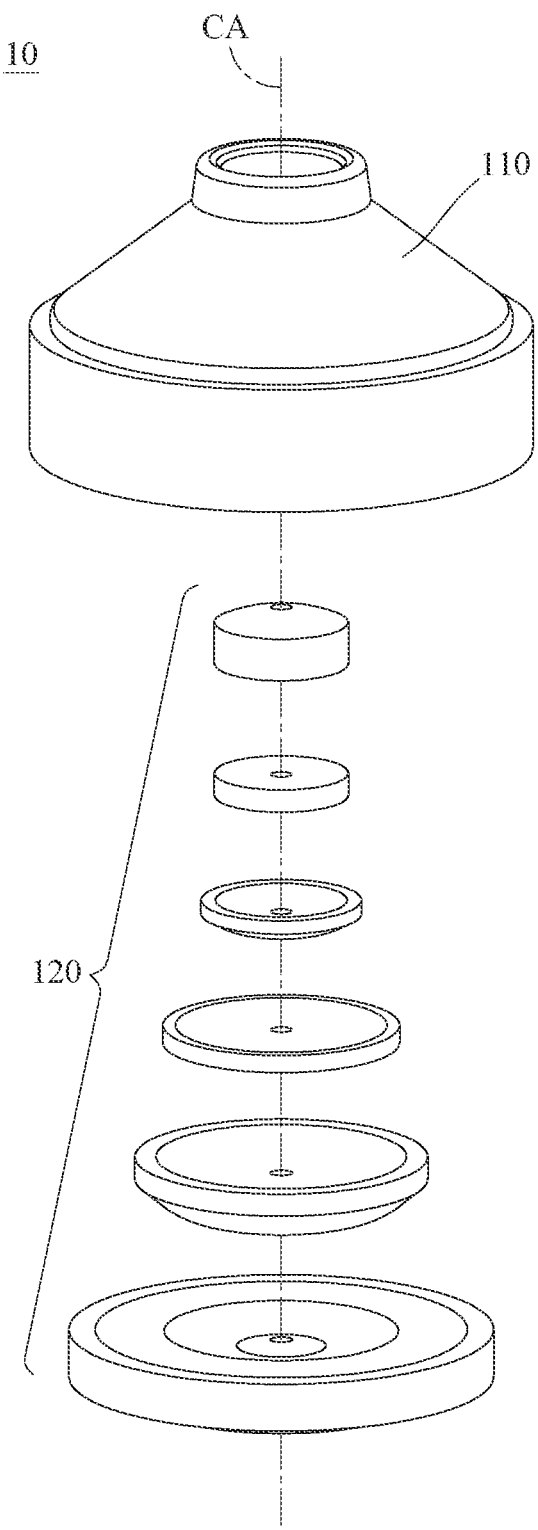
FIG. 3 is an exploded view of an imaging lens of the camera module in FIG. 2.
Figure 4:
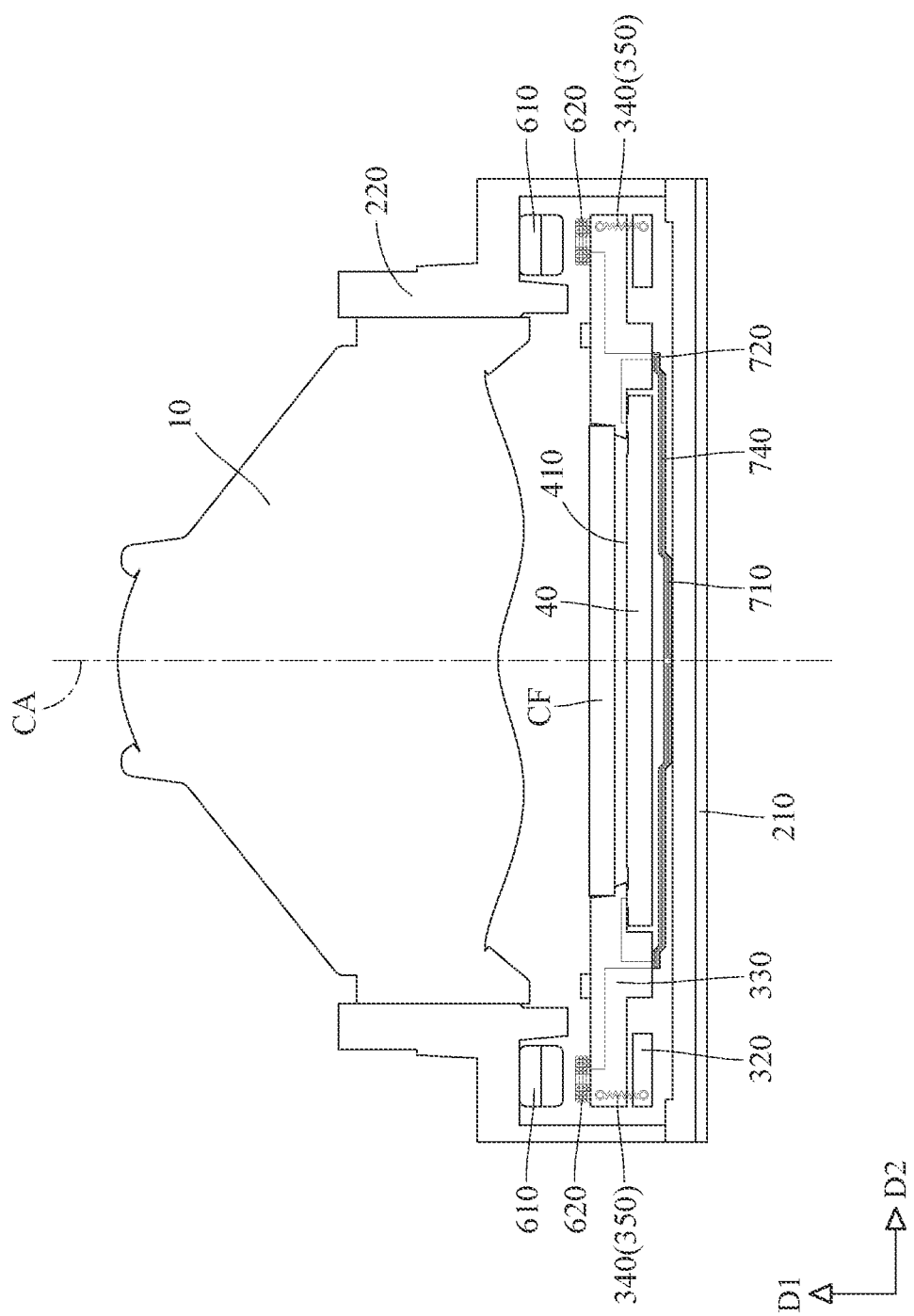
FIG. 4 is a cross-sectional view of the camera module in FIG. 1.
Figure 5:
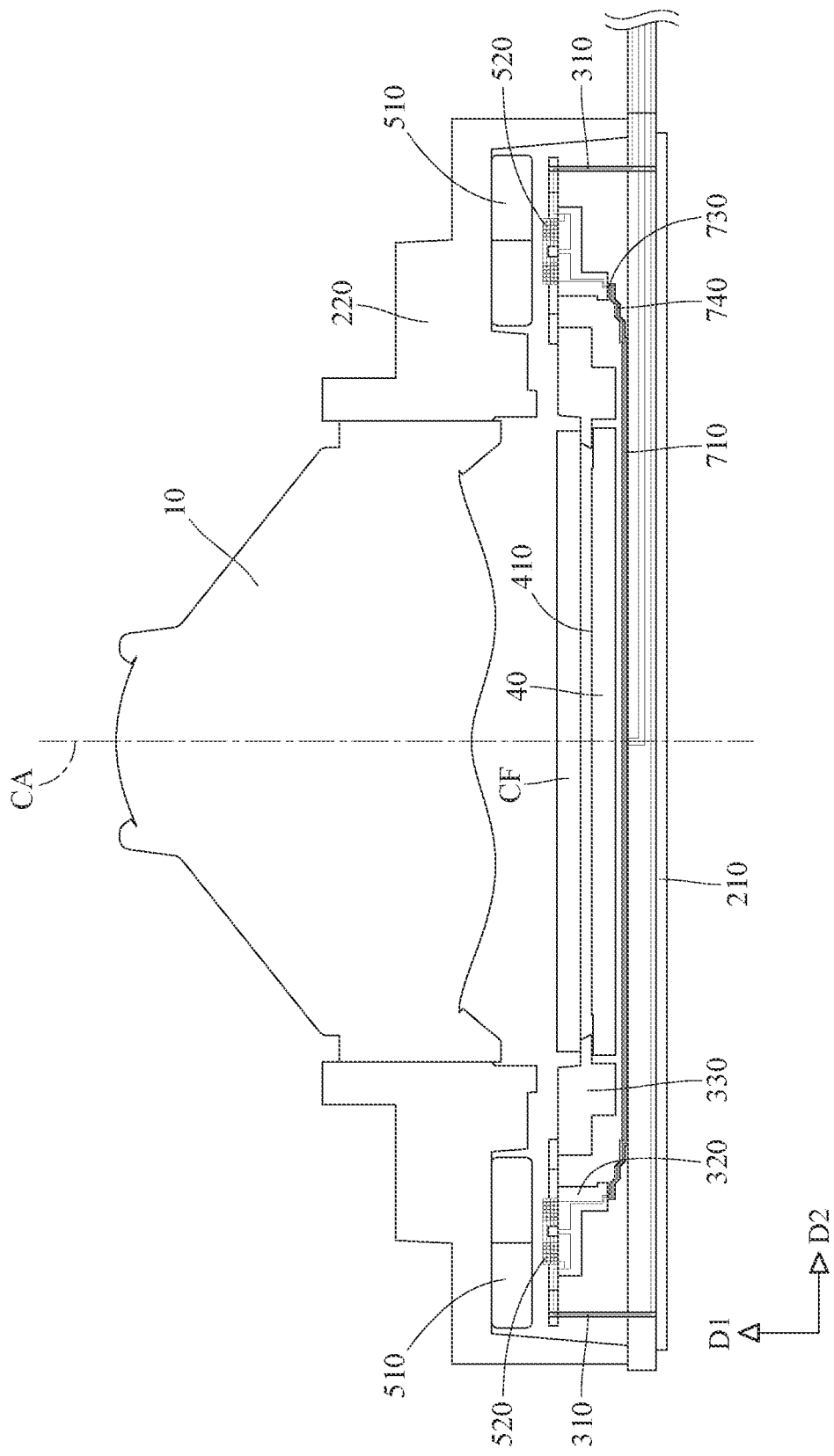
FIG. 5 is another cross-sectional view of the camera module in FIG. 1.

Please refer to FIG. 1 through FIG. 5. FIG. 1 is a perspective view of a camera module according to the 1st embodiment of the present disclosure, FIG. 2 is an exploded view of the camera module in FIG. 1, FIG. 3 is an exploded view of an imaging lens of the camera module in FIG. 2, FIG. 4 is a cross-sectional view of the camera module in FIG. 1, and FIG. 5 is another cross-sectional view of the camera module in FIG. 1. For the purpose of illustration, some elements are omitted or simply depicted in the drawings.

In this embodiment, a camera module 1 includes an imaging lens 10, a holder 20, a movable carrier 30, an image sensor 40, at least one corner drive mechanism 50, at least one side drive mechanism 60, an electrical connection element 70 and at least one position sensing element 80.

The imaging lens 10 includes a lens carrier 110 and a lens assembly 120. The lens carrier 110 is, for example but not limited to, a lens barrel for accommodating the lens assembly 120 which includes a plurality of lens elements, such that the imaging lens 10 is applicable to an electronic device (not shown in this embodiment). Each of the lens elements is located at specific position on an optical axis CA of the imaging lens 10. The lens elements of the lens assembly 120 are arranged in order along the optical axis CA of the imaging lens 10. In addition to the lens elements, the lens assembly 120 may include other optical elements, such as a light folding element.

The holder 20 includes a base 210 and a magnet carrier 220 assembled together. The base 210 is, for example but not limited to, a flexible printed circuit board (FPCB) provided for carrying the movable carrier 30, the image sensor 40 and the electrical connection element 70. The magnet carrier 220 is configured to carry, for example but not limited to, the corner drive mechanisms 50 and the side drive mechanisms 60. The imaging lens 10 is disposed on the magnet carrier 220.

The movable carrier 30 includes a set of support elements 310, a first frame 320, a second frame 330, an upper elastic element 340 and a lower elastic element 350. The support elements 310 provide support for the first frame 320 of the movable carrier 30 in a focusing direction D1, and the support element 310 also provides freedom of movement for the first frame 320 in a translational direction D2. Moreover, the focusing direction D1 refers to a direction in which a photosensitive surface 410 of the image sensor 40 moves close to or away from the imaging lens 10, and the translational direction D2 is orthogonal to the focusing direction D1. The first frame 320 is sustained on the base 210 by the support elements 310, and the second frame 330 can move relative to the first frame 320 in the focusing direction D1.

The image sensor 40 is disposed at an image side of the imaging lens 10. In detail, the image sensor 40 is disposed on the second frame 330 of the movable carrier 30, and the photosensitive surface 410 of the image sensor 40 faces the imaging lens 10. The photosensitive surface 410 may be rectangular.

The upper elastic element 340 and the lower elastic element 350 provide freedom of movement for the second frame 330 of the movable carrier 30 in the focusing direction D1. Specifically, when the upper elastic element 340 and the lower elastic element 350 are deformed, the upper elastic element 340 and the lower elastic element 350 can apply force on the second frame 330 so as to adjust the amount of movement of the second frame 330 in the focusing direction D1. Furthermore, the lower elastic element 350 is between the image sensor 40 and the base 210, and the image sensor 40 is in physical contact with the lower elastic element 350, such that the image sensor 40 transfers heat through the lower elastic element 350.

The corner drive mechanism 50 is disposed corresponding to a corner of the photosensitive surface 410 of the image sensor 40. The corner drive mechanism 50 is, for example but not limited to, a VCM including a corner magnet 510 (drive magnet) and a corner coil 520 (drive coil), and the corner magnet 510 is disposed opposite to the corner coil 520. The corner magnet 510 is disposed on the magnet carrier 220 of the holder 20 so as to be fixed relative to the imaging lens 10, and the corner coil 520 is disposed on the first frame 320 of the movable carrier 30. The support element 310 of the movable carrier 30 is electrically connected to the corner coil 520 of the corner drive mechanism 50 via the routing inside the first frame 320.

The side drive mechanism 60 is disposed corresponding to a side of the photosensitive surface 410 of the image sensor 40, and the corner drive mechanism 50 is disposed adjacent to the side drive mechanism 60. The side drive mechanism 60 is, for example but not limited to, a VCM including a side magnet 610 (drive magnet) and a side coil 620 (drive coil), and the side magnet 610 is disposed opposite to the side coil 620. The side magnet 610 is disposed on the magnet carrier 220 of the holder 20 so as to be fixed relative to the imaging lens 10, and the side coil 620 is disposed on the second frame 330 of the movable carrier 30. The direction of a magnetic field F1 of the corner magnet 510 is non-parallel to the direction of a magnetic field F2 of the side magnet 610. The upper elastic element 340 of the movable carrier 30 is electrically connected to the side coil 620 of the side drive mechanism 60.

The camera module 1 according to this embodiment includes a total of four corner drive mechanisms 50 and a total of four side drive mechanisms 60. Two of the corner drive mechanisms 50 which are non-adjacent may be arranged symmetrically about the optical axis CA, and two of the side drive mechanisms 60 which are non-adjacent may be arranged symmetrically about the optical axis CA.

Figure 6:
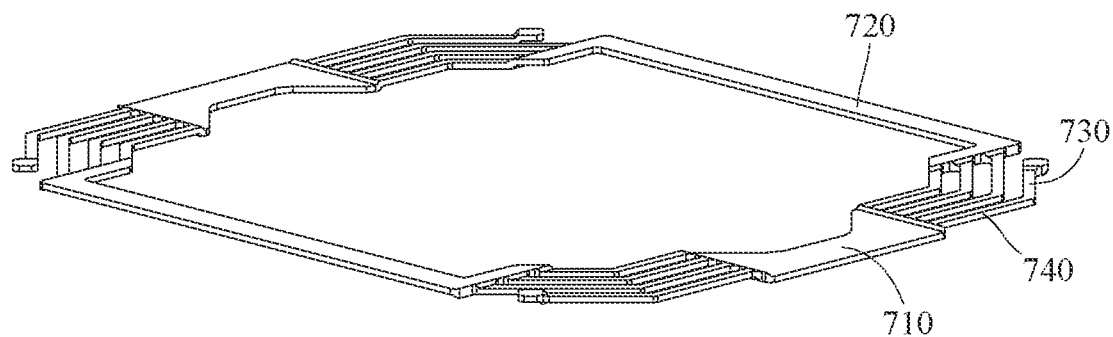
FIG. 6 is a perspective view of an electrical connection element of the camera module in FIG. 2.
Figure 7:
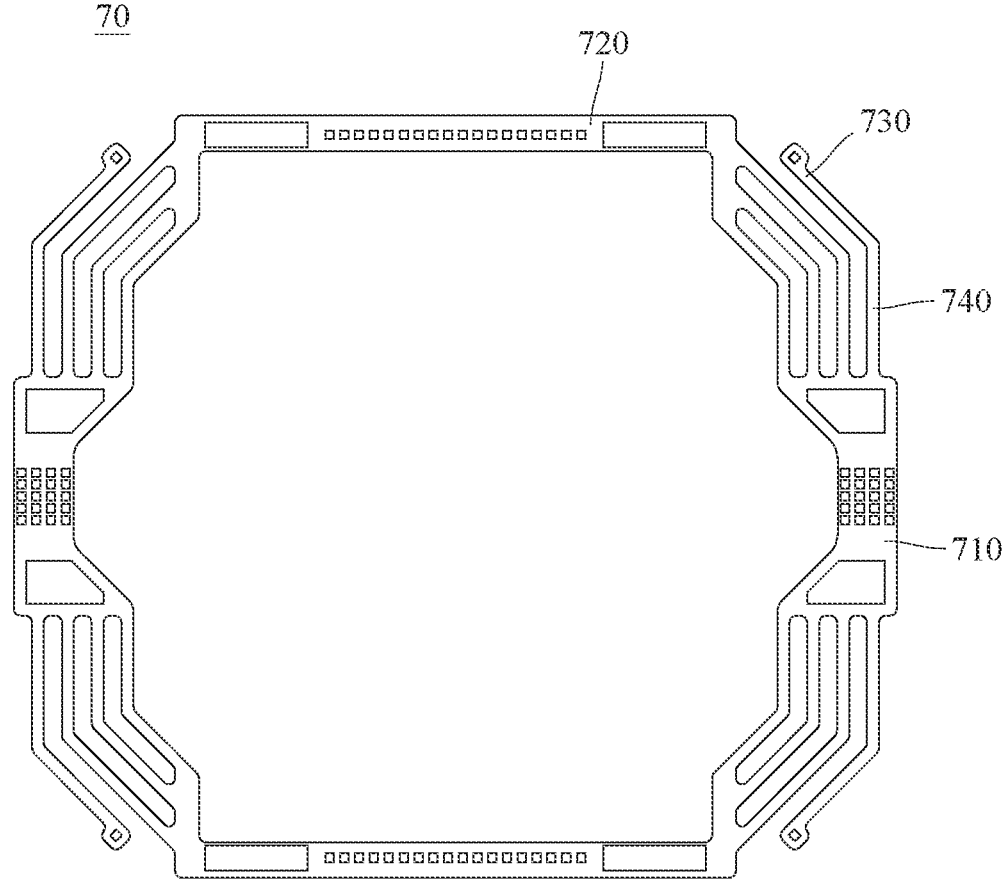
FIG. 7 is a top view of the electrical connection element in FIG. 6.
Figure 8:
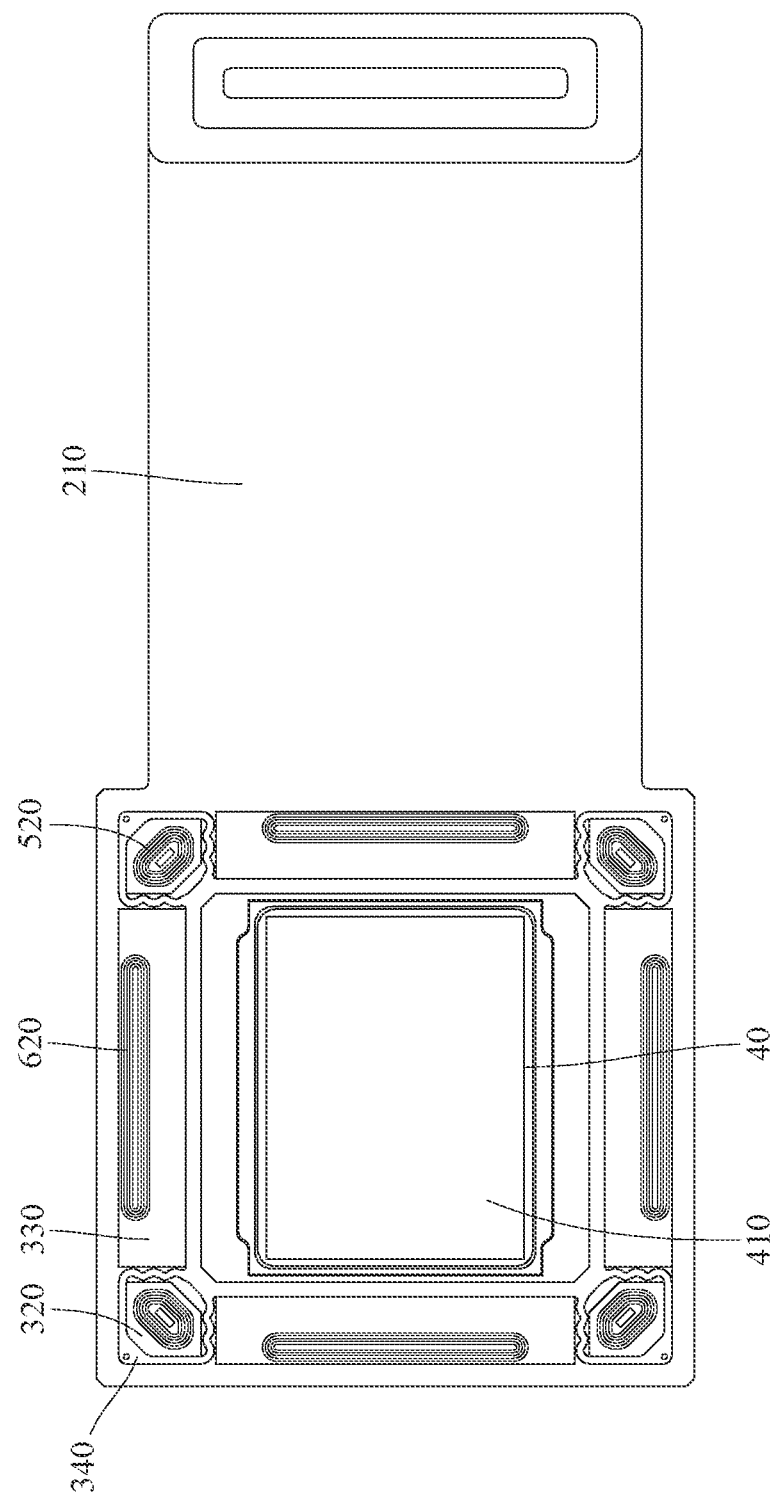
FIG. 8 is a top view of some elements of the camera module in FIG. 1.
Figure 9:
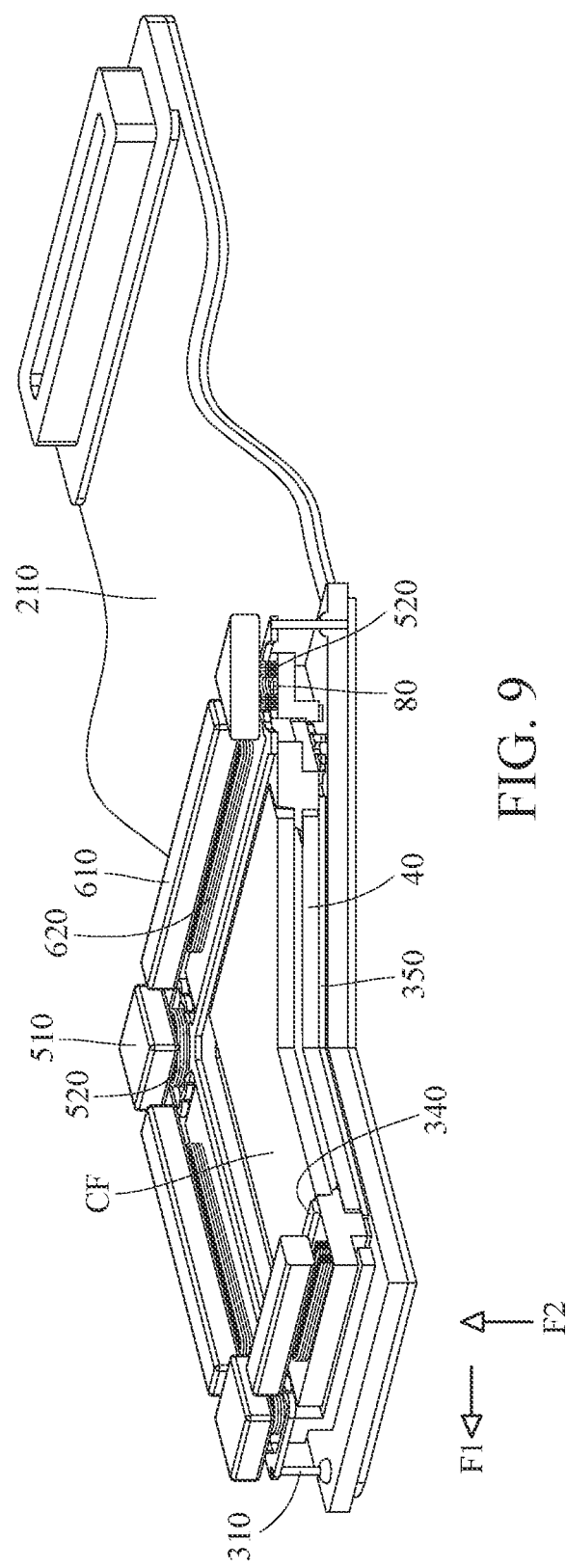
FIG. 9 is a perspective view of the elements of the camera module in FIG. 8 which are partially sectioned.
Figure 10:
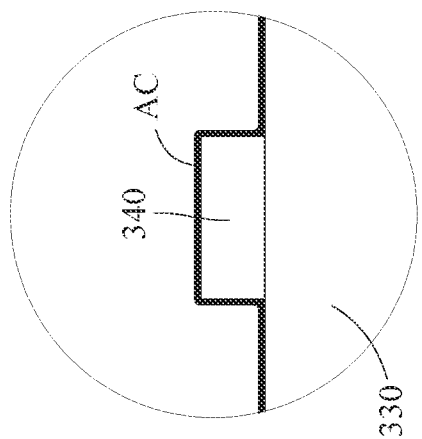
FIG. 10 is a schematic view of a light absorbing surface of the camera module in FIG. 9.

The electrical connection element 70 is electrically connected to the image sensor 40. Please refer to FIG. 6 through FIG. 10. FIG. 6 is a perspective view of an electrical connection element of the camera module in FIG. 2, FIG. 7 is a top view of the electrical connection element in FIG. 6, FIG. 8 is a top view of some elements of the camera module in FIG. 1, FIG. 9 is a perspective view of the elements of the camera module in FIG. 8 which are partially sectioned, and FIG. 10 is a schematic view of a light absorbing surface of the camera module in FIG. 9. The electrical connection element 70 includes a first connection part 710, a second connection part 720, a third connection part 730 and a conductive part 740. The second connection part 720 can move relative to the first connection part 710 in the focusing direction D1 and the translational direction D2. The conductive part 740 is flexible, and the conductive part 740 connects the first connection part 710 to the second connection part 720. The conductive part 740 includes a plurality of conductive lines configured for the electrical connection between the first connection part 710 and the second connection part 720. The conductive part 740 also connects the third connection part 730 to the first connection part 710. The image sensor 40 and the side coil 620 are electrically connected to the electrical connection element 70 via the routing inside the second frame 330. The corner coil 520 is electrically connected to the third connection part 730 of the electrical connection element 70 via the routing inside the first frame 320.

The position sensing element 80 is configured to detect a position of the image sensor 40. The corner drive mechanism 50 and the side drive mechanism 60 can generate required magnetic field according to the detected position information. Furthermore, the support element 310 of the movable carrier 30 is a metallic wire electrically connected to the corner coil 520 and the position sensing element 80.

The camera module 1 according to this embodiment further includes an optical filter CF. The optical filter CF is disposed between the imaging lens 10 and the image sensor 40. The optical filter CF can be helpful to reduce the intensity of light at specific frequency. Said light at specific frequency may include infrared light, visible light, and ultraviolet light. The optical filter CF may also selectively allow light with specific polarization to pass therethrough.

Furthermore, the movable carrier 30 includes a light absorbing surface facing the imaging lens 10, and the light absorbing surface may be an anti-reflective coating AC on surfaces of the movable carrier 30 and the upper elastic element 340.

Referring to FIG. 4, the side magnet 610 and the side coil 620 of the side drive mechanism 60 together drive the second frame 330 of the movable carrier 30 to move vertically. The second frame 330 also brings the image sensor 40 to move close to or away from the imaging lens 10 in the focusing direction D1, thereby accomplishing an auto focusing function of the camera module 1.

Referring further to FIG. 5, the corner coil 520 can generate a magnetic field according to the position information of the image sensor 40 detected by the position sensing element 80, such that the corner magnet 510 and the corner coil 520 of the corner drive mechanism 50 together drive the first frame 320 of the movable carrier 30 to move horizontally. The first frame 320 brings the image sensor 40 to move in the translational direction D2 so as to maintain a relative position to the imaging lens 10, thereby accomplishing an optical image stabilization (OIS) function of the camera module 1.

2nd Embodiment

Figure 11:
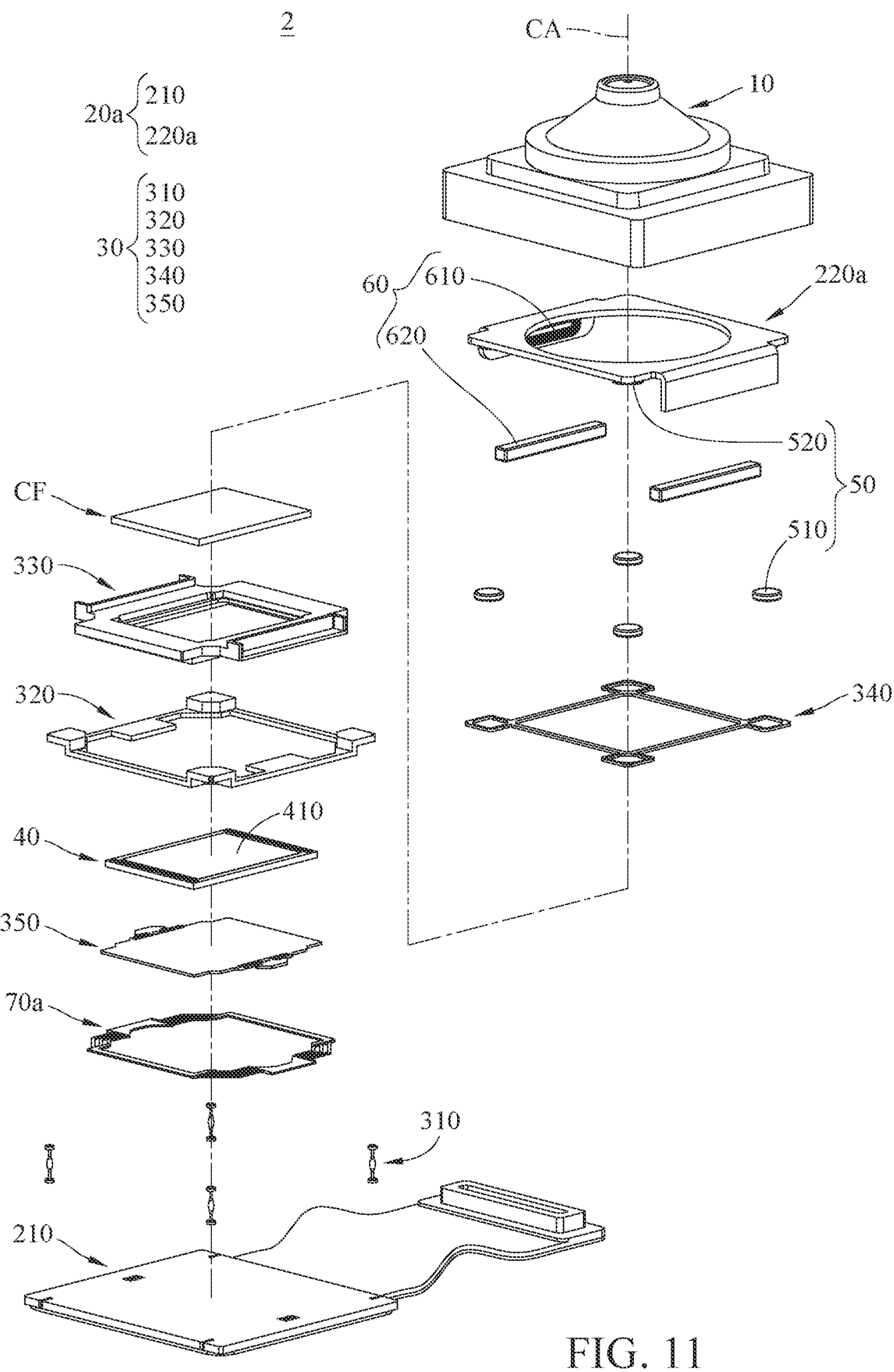
FIG. 11 is an exploded view of a camera module according to the 2nd embodiment of the present disclosure.
Figure 12:
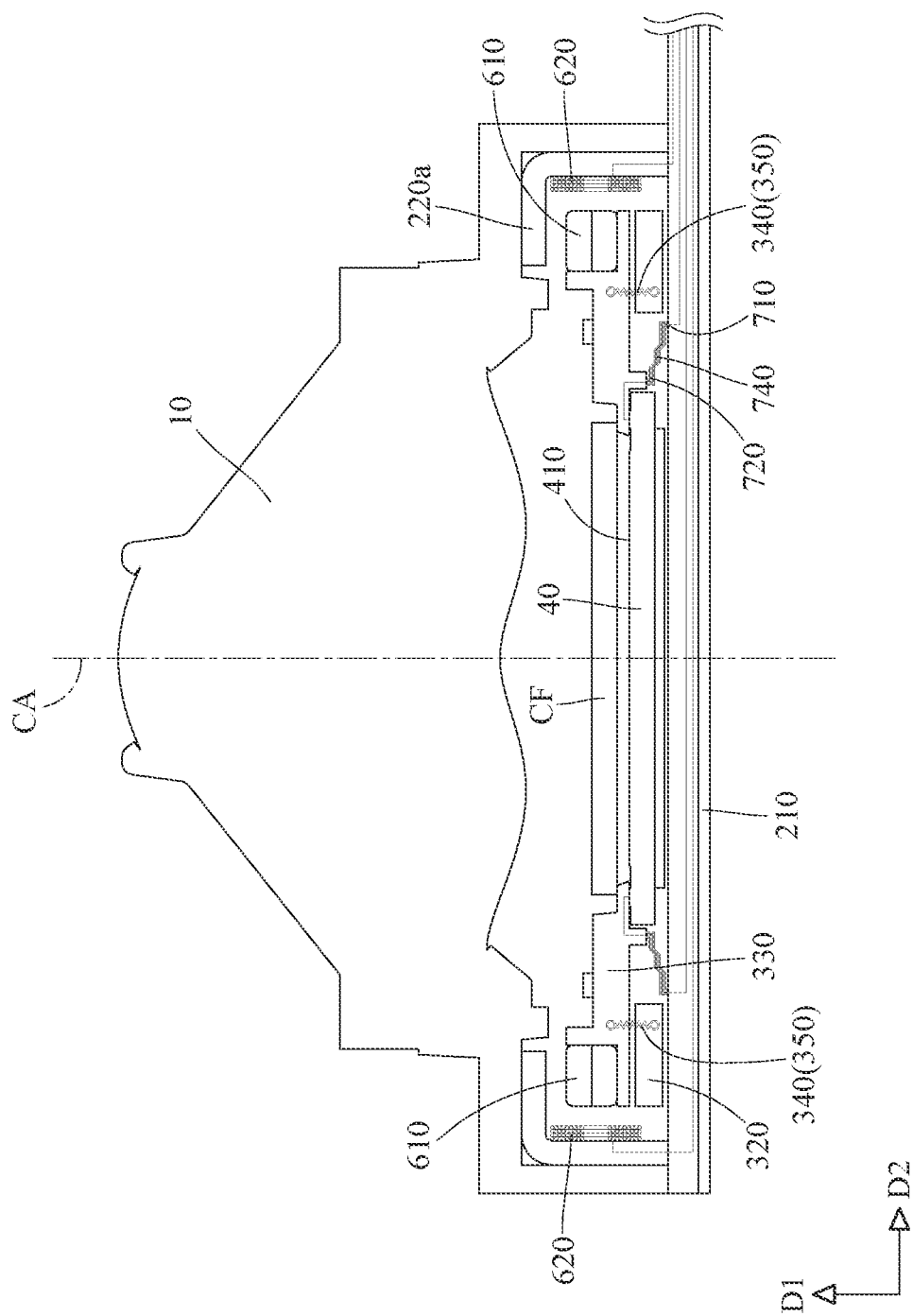
FIG. 12 is a cross-sectional view of the camera module according to the 2nd embodiment of the present disclosure.
Figure 13:
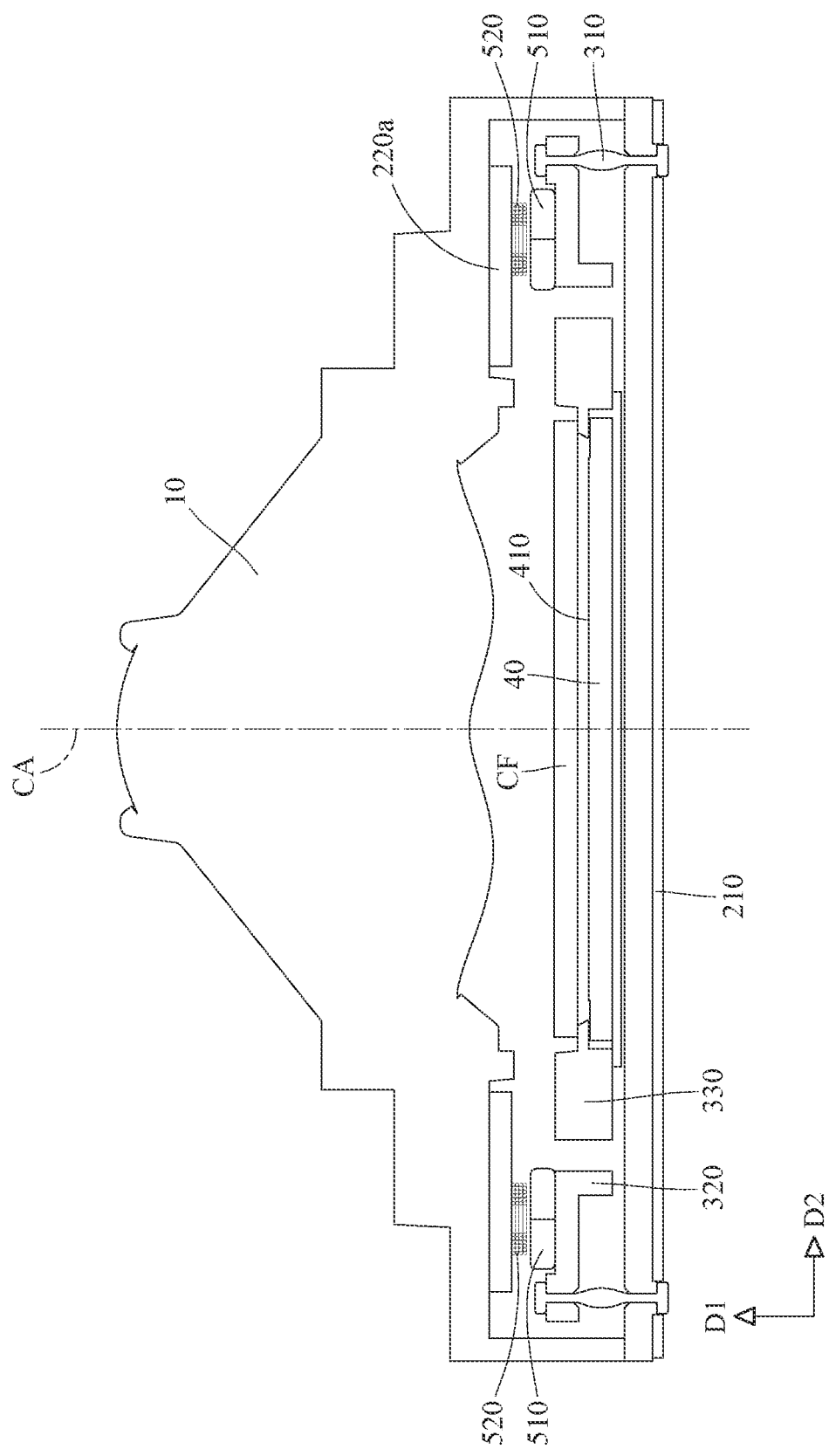
FIG. 13 is another cross-sectional view of the camera module according to the 2nd embodiment of the present disclosure.
Figure 14:
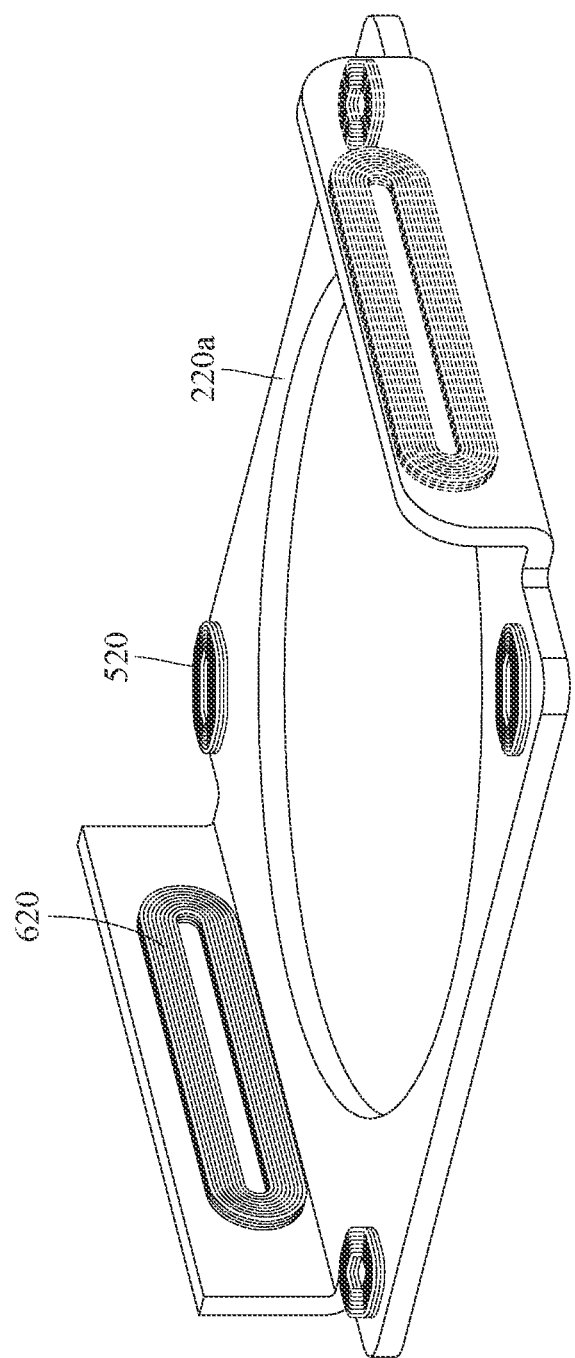
FIG. 14 is a perspective view of a corner drive mechanism and a side drive mechanism of the camera module in FIG. 11.

Please refer to FIG. 11 through FIG. 14. FIG. 11 is an exploded view of a camera module according to the 2nd embodiment of the present disclosure, FIG. 12 is a cross-sectional view of the camera module according to the 2nd embodiment of the present disclosure, FIG. 13 is another cross-sectional view of the camera module according to the 2nd embodiment of the present disclosure, and FIG. 14 is a perspective view of a corner drive mechanism and a side drive mechanism of the camera module in FIG. 11.

In this embodiment, a camera module 2 includes an imaging lens 10, a holder 20a, a movable carrier 30, an image sensor 40, at least one corner drive mechanism 50, at least one side drive mechanism 60 and an electrical connection element 70a. The configuration of the imaging lens 10 is similar to that in the first embodiment, such that related description is omitted hereafter. For the purpose of illustration, some elements are omitted or simply depicted in the drawings.

The holder 20a includes a base 210 and a coil circuit element 220a assembled together. The base 210 is, for example but not limited to, a FPCB provided for carrying the movable carrier 30, the image sensor 40 and the electrical connection element 70a. The coil circuit element 220a is configured to carry, for example but not limited to, the corner drive mechanism 50 and the side drive mechanism 60, and the coil circuit element 220a is electrically connected to the base 210.

The movable carrier 30 includes a set of support elements 310, a first frame 320, a second frame 330, an upper elastic element 340 and a lower elastic element 350. The support elements 310 provide support for the first frame 320 of the movable carrier 30 in a focusing direction D1, and the support elements 310 also provide freedom of movement for the first frame 320 in a translational direction D2. Moreover, the focusing direction D1 refers to a direction in which a photosensitive surface 410 of the image sensor 40 moves close to or away from the imaging lens 10, and the translational direction D2 is orthogonal to the focusing direction D1. The first frame 320 is sustained on the base 210 by the support elements 310, and the second frame 330 can move relative to the first frame 320 in the focusing direction D1.

The image sensor 40 is disposed at an image side of the imaging lens 10. In detail, the image sensor 40 is disposed on the second frame 330 of the movable carrier 30, and the photosensitive surface 410 of the image sensor 40 faces the imaging lens 10. The photosensitive surface 410 may be rectangular.

The upper elastic element 340 and the lower elastic element 350 provide freedom of movement for the second frame 330 of the movable carrier 30 in the focusing direction D1. Specifically, when the upper elastic element 340 and the lower elastic element 350 are deformed, the upper elastic element 340 and the lower elastic element 350 can apply force on the second frame 330 so as to adjust the amount of movement of the second frame 330 in the focusing direction D1. Furthermore, the lower elastic element 350 is between the image sensor 40 and the base 210, and the image sensor 40 is in physical contact with the lower elastic element 350, such that the image sensor 40 is electrically connected to the electrical connection element 70a via the routing inside the second frame 330 and the lower elastic element 350.

The corner drive mechanism 50 is disposed corresponding to a corner of the photosensitive surface 410 of the image sensor 40. The corner drive mechanism 50 is, for example but not limited to, a VCM including a corner magnet 510 (drive magnet) and a corner coil 520 (drive coil), and the corner magnet 510 is disposed opposite to the corner coil 520. The corner coil 520 is disposed on the coil circuit element 220a of the holder 20a so as to be fixed relative to the imaging lens 10, and the corner magnet 510 is disposed on the first frame 320 of the movable carrier 30.

The side drive mechanism 60 is disposed corresponding to a side of the photosensitive surface 410 of the image sensor 40, and the corner drive mechanism 50 is disposed adjacent to the side drive mechanism 60. The side drive mechanism 60 is, for example but not limited to, a VCM including a side magnet 610 (drive magnet) and a side coil 620 (drive coil), and the side magnet 610 is disposed opposite to the side coil 620. The side coil 620 is disposed on the coil circuit element 220a of the holder 20a so as to be fixed relative to the imaging lens 10, and the side magnet 610 is disposed on the second frame 330 of the movable carrier 30. The direction of a magnetic field F1 of the corner magnet 510 is non-parallel to the direction of a magnetic field F2 of the side magnet 610. Moreover, in this embodiment, the corner coil 520 and the side coil 620 are disposed on the same circuit element (that is, the coil circuit element 220a).

The camera module 2 according to this embodiment includes a total of four corner drive mechanisms 50 and a total of two side drive mechanisms 60. Two of the corner drive mechanisms 50 which are non-adjacent may be arranged symmetrically about the optical axis CA of the imaging lens 10, and the two side drive mechanisms 60 may be arranged symmetrically about the optical axis CA.

Figure 15:
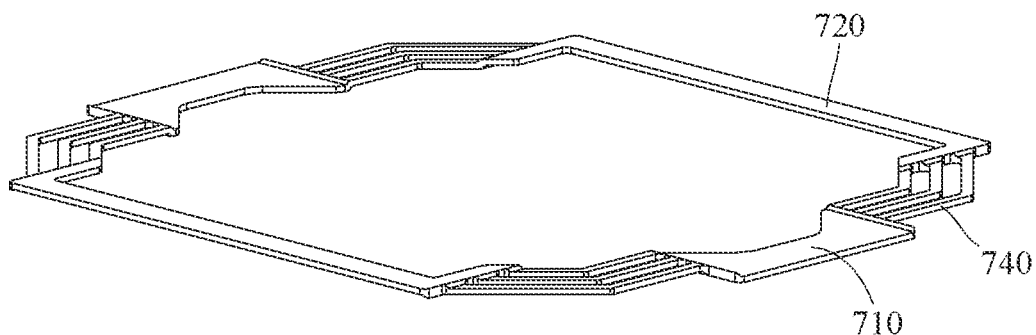
FIG. 15 is a perspective view of an electrical connection element of the camera module in FIG. 11.
Figure 16:
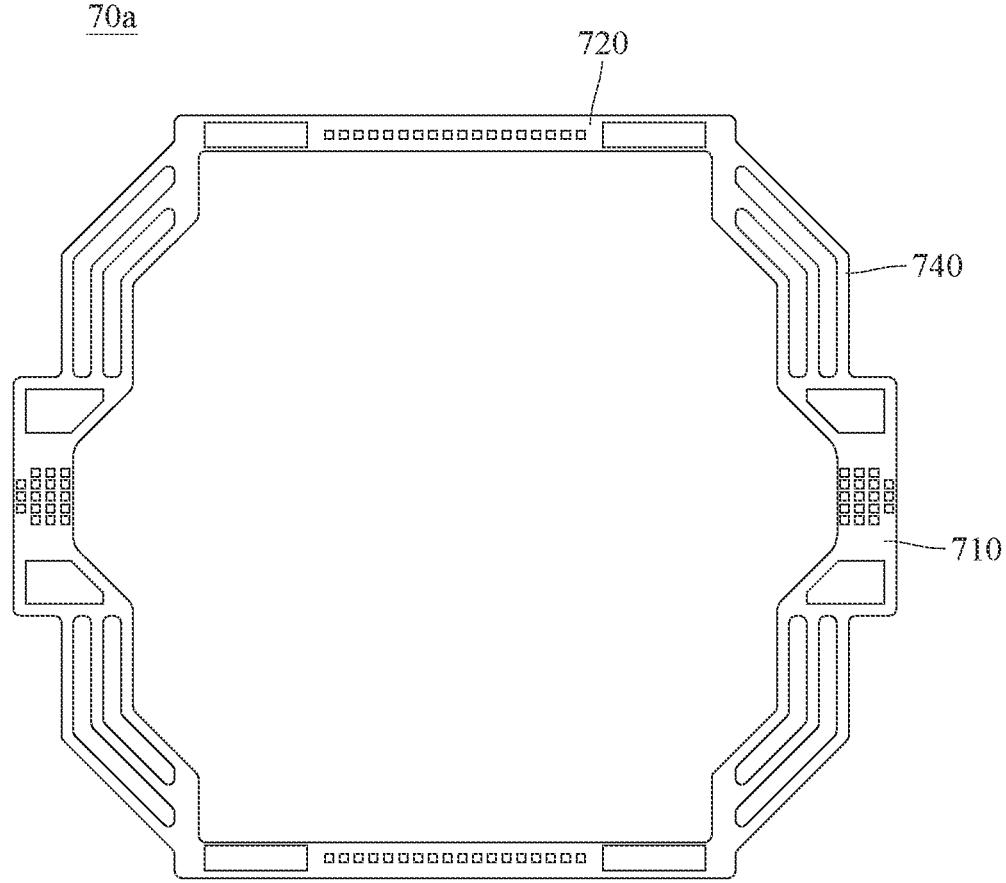
FIG. 16 is a top view of the electrical connection element in FIG. 15.
Figure 17:
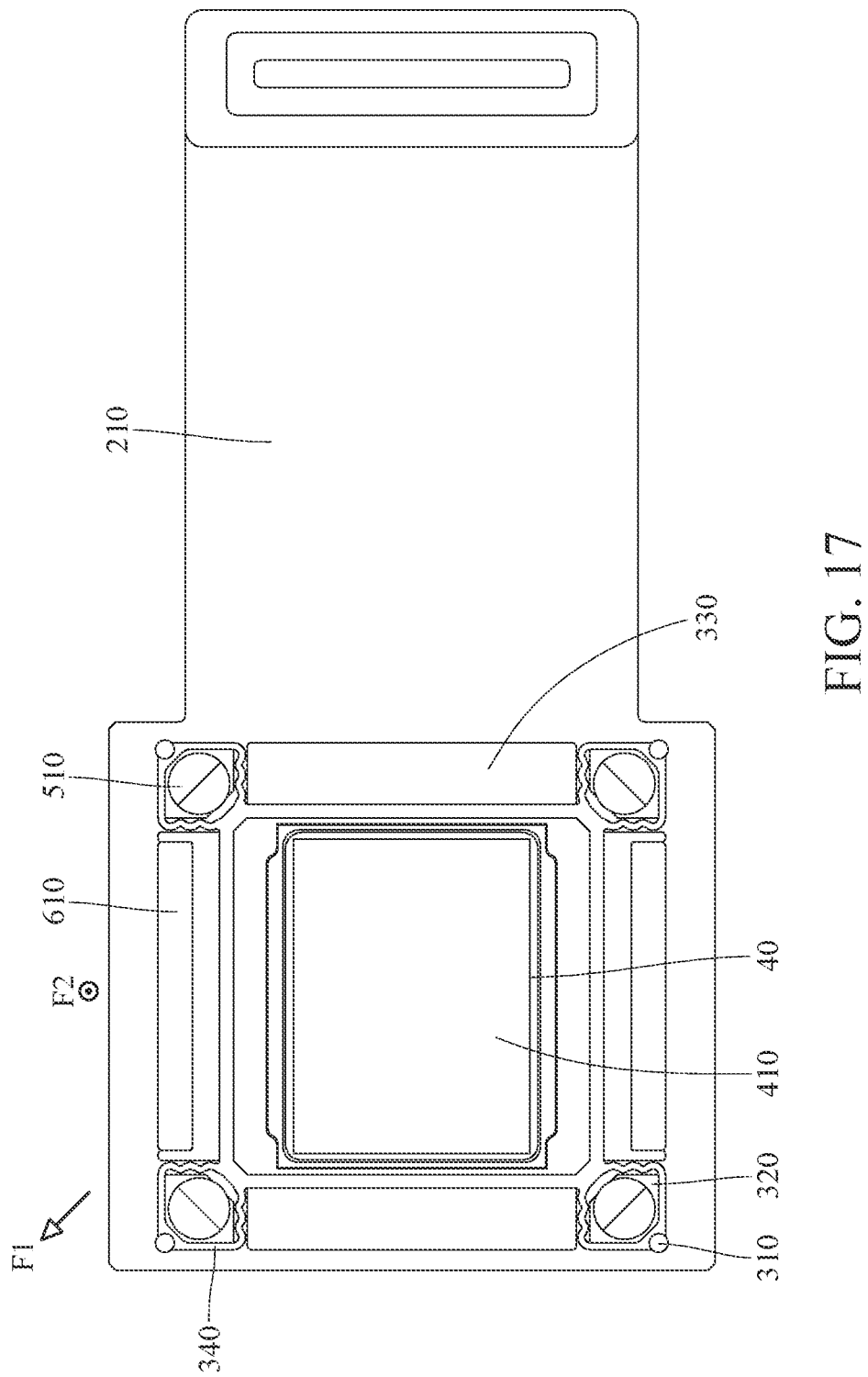
FIG. 17 is a top view of some elements of the camera module in FIG. 11.
Figure 18:
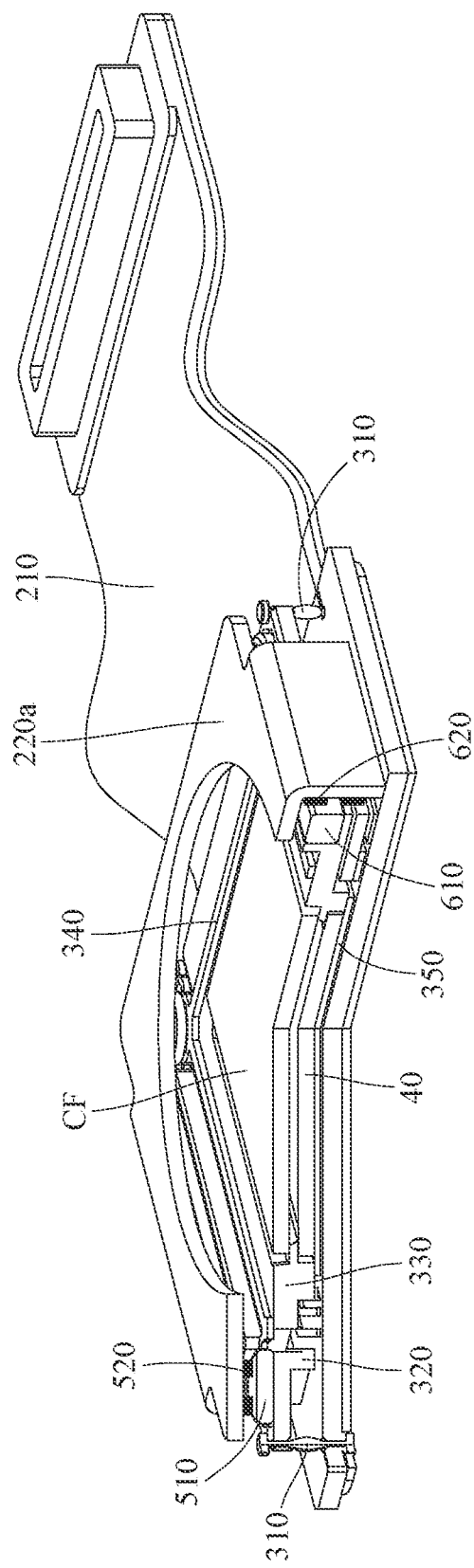
FIG. 18 is a perspective view of the elements of the camera module in FIG. 17 which are partially sectioned.

The electrical connection element 70a is electrically connected to the image sensor 40. Please refer to FIG. 15 through FIG. 18. FIG. 15 is a perspective view of an electrical connection element of the camera module in FIG. 11, FIG. 16 is a top view of the electrical connection element in FIG. 15, FIG. 17 is a top view of some elements of the camera module in FIG. 11, and FIG. 18 is a perspective view of the elements of the camera module in FIG. 17 which are partially sectioned. The electrical connection element 70a includes a first connection part 710, a second connection part 720 and a conductive part 740. The second connection part 720 can move relative to the first connection part 710 in the focusing direction D1 and the translational direction D2. The conductive part 740 is flexible, and the conductive part 740 connects the first connection part 710 to the second connection part 720. The conductive part 740 includes a plurality of conductive lines configured for the electrical connection between the first connection part 710 and the second connection part 720. The image sensor 40 is electrically connected to the electrical connection element 70a via the routing inside the second frame 330.

The camera module 2 according to this embodiment further includes an optical filter CF. The optical filter CF is disposed between the imaging lens 10 and the image sensor 40.

Referring to FIG. 12, the side coil 620 can change its magnetic field, such that the side magnet 610 and the side coil 620 of the side drive mechanism 60 together drive the second frame 330 of the movable carrier 30 to move vertically. The second frame 330 also brings the image sensor 40 to move close to or away from the imaging lens 10 in the focusing direction D1, thereby accomplishing auto focusing function of the camera module 2.

Referring further to FIG. 13, the corner coil 520 can change its magnetic field, such that the corner magnet 510 and the corner coil 520 of the corner drive mechanism 50 together drive the first frame 320 of the movable carrier 30 to move horizontally. The first frame 320 brings the image sensor 40 to move in the translational direction D2 so as to maintain a relative position to the imaging lens 10, thereby accomplishing optical image stabilization (OIS) function of the camera module 2.

3rd Embodiment

Figure 19:
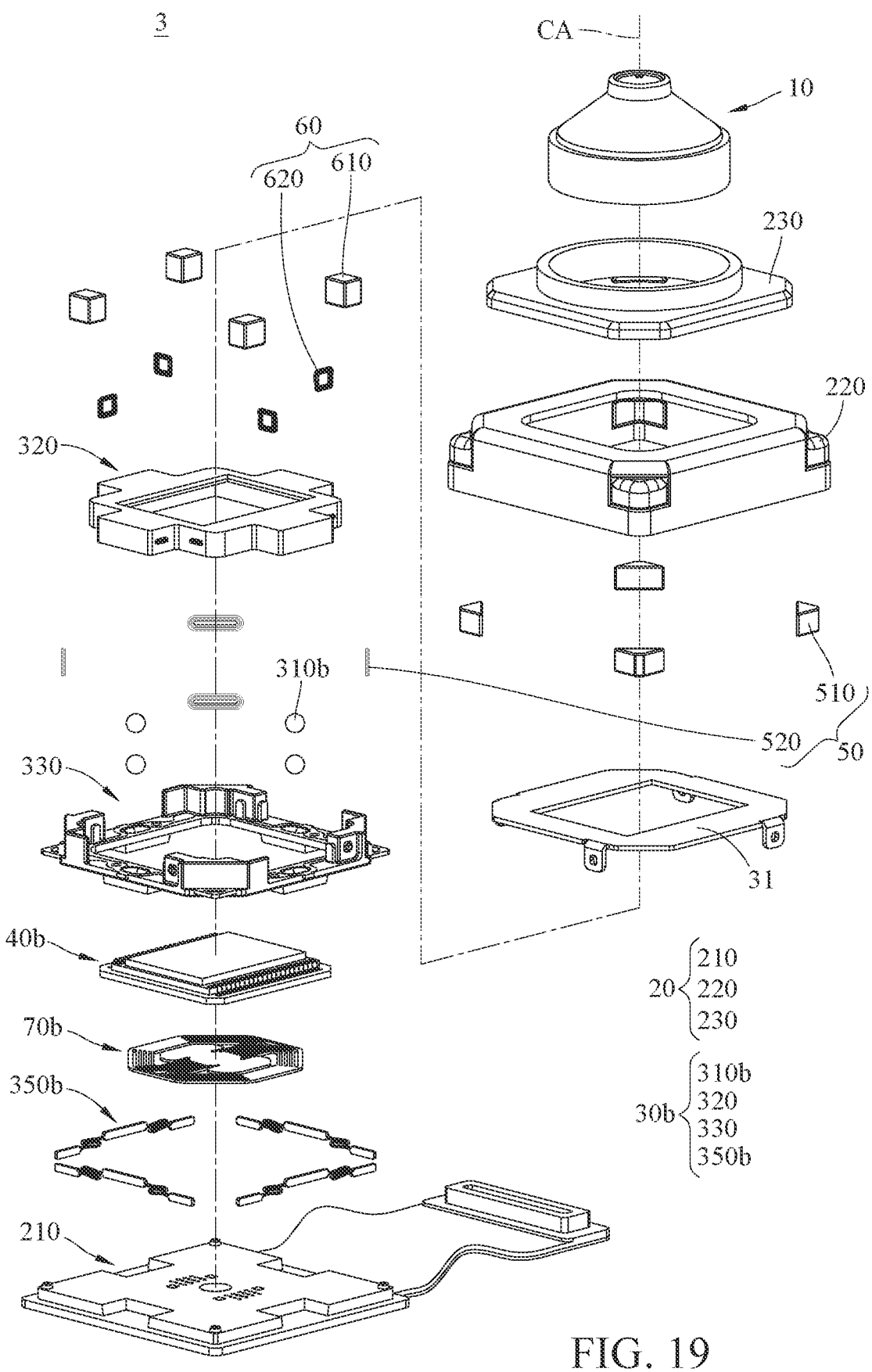
FIG. 19 is an exploded view of a camera module according to the 3rd embodiment of the present disclosure.
Figure 20:
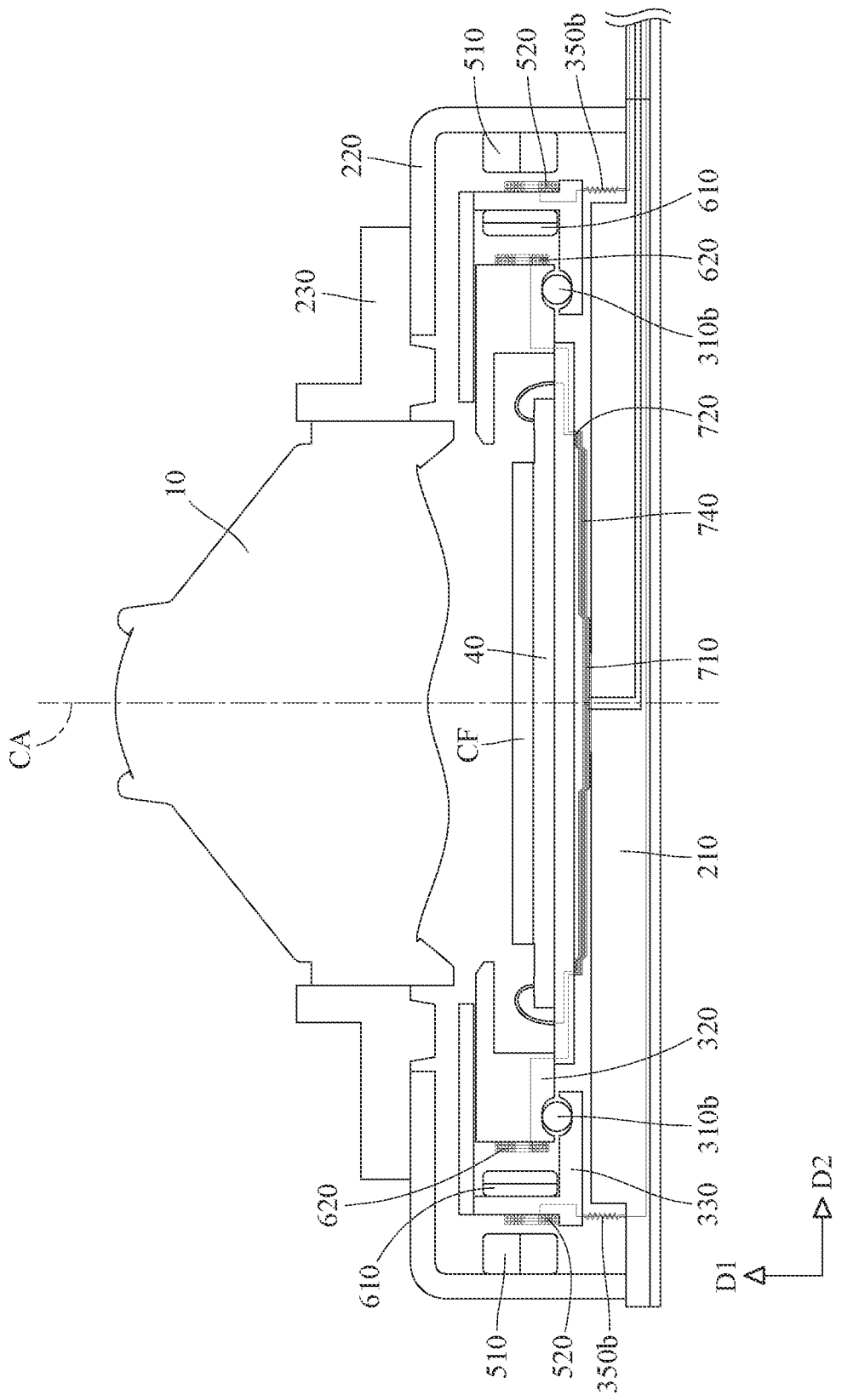
FIG. 20 is a cross-sectional view of the camera module according to the 3rd embodiment of the present disclosure.
Figure 21:
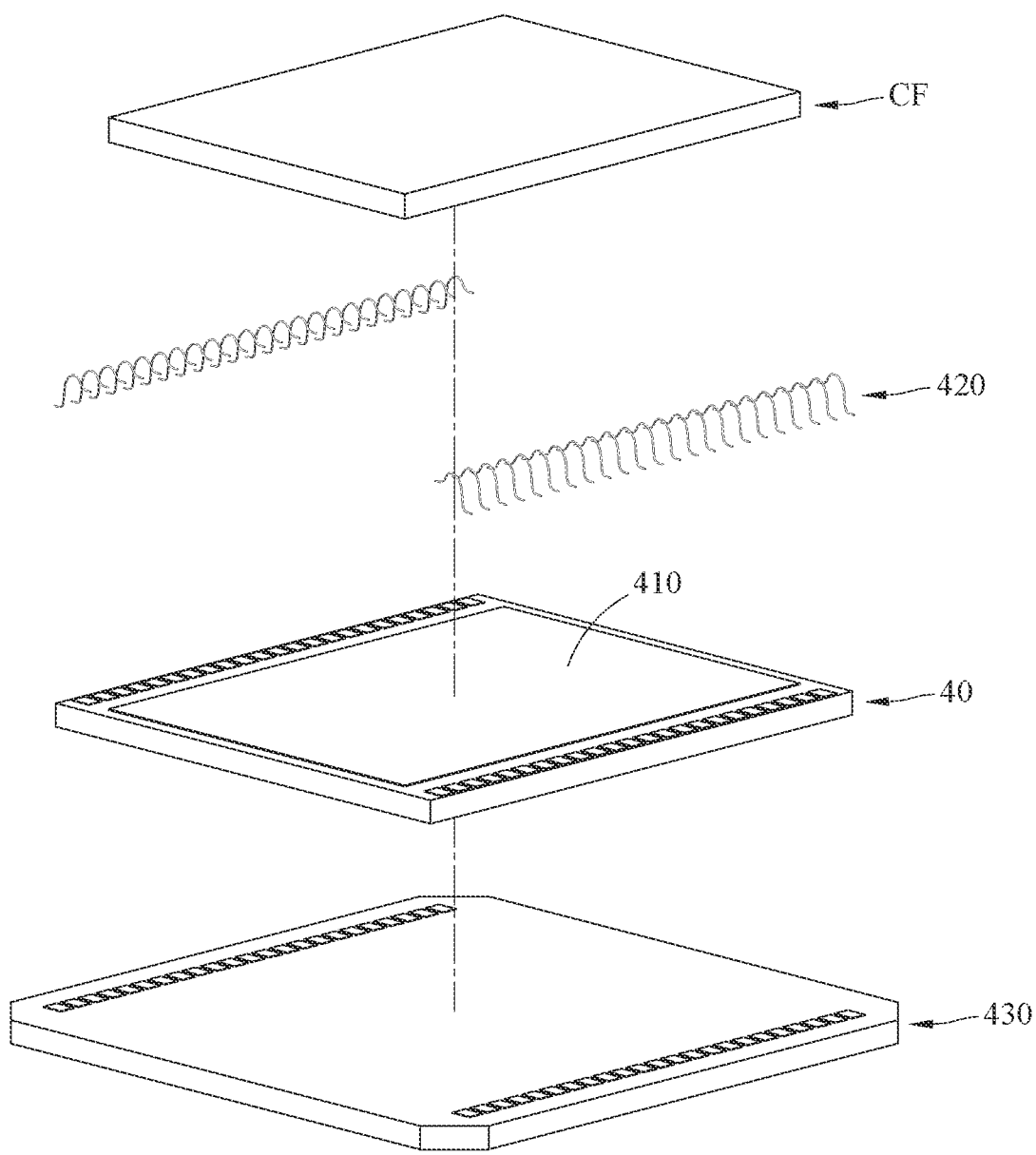
FIG. 21 is an exploded view of an image sensing assembly of the camera module in FIG. 19.

Please refer to FIG. 19 through FIG. 21. FIG. 19 is an exploded view of a camera module according to the 3rd embodiment of the present disclosure, FIG. 20 is a cross-sectional view of the camera module according to the 3rd embodiment of the present disclosure, and FIG. 21 is an exploded view of an image sensing assembly of the camera module in FIG. 19.

In this embodiment, a camera module 3 includes an imaging lens 10, a holder 20, a movable carrier 30b, an image sensing assembly 40b, at least one corner drive mechanism 50, at least one side drive mechanism 60, an electrical connection element 70b and an elastic protrusion structure. The configuration of the imaging lens 10 is similar to that in the first embodiment, such that related description is omitted hereafter. For the purpose of illustration, some elements are omitted or simply depicted in the drawings.

The holder 20 includes a base 210, a magnet carrier 220 and a lens carrier 230 which are assembled together. The base 210 is, for example but not limited to, a FPCB provided for carrying the movable carrier 30b, the image sensing assembly 40b, and the electrical connection element 70b. The magnet carrier 220 is configured to carry, for example but not limited to, the corner drive mechanism 50 and the side drive mechanism 60. The lens carrier 230 is assembled with the magnet carrier 220, and the imaging lens 10 is carried on the lens carrier 230.

The movable carrier 30b includes a set of support elements 310b, a first frame 320, a second frame 330 and a set of side elastic elements 350b. The support elements 310b provide support for the first frame 320 of the movable carrier 30b in a focusing direction D1, and the support elements 310b also provide freedom of movement for the first frame 320 in a translational direction D2. Moreover, the focusing direction D1 refers to a direction in which a photosensitive surface 410 of the image sensing assembly 40b moves close to or away from the imaging lens 10, and the translational direction D2 is orthogonal to the focusing direction D1. The first frame 320 is sustained on the second frame 330 by the support elements 310b. Also, each of the support element 310b is a rollable element such as, but not limited to, a ball, a cylinder, a cone, and a Reuleaux tetrahedral structure.

The image sensing assembly 40b is disposed at an image side of the imaging lens 10. In detail, image sensing assembly 40b is disposed on the first frame 320 of the movable carrier 30b, and the image sensing assembly 40b includes an optical filter CF, an image sensor 40, at least one connection line 420 and a circuit board 430. The image sensor 40 is electrically connected to the circuit board 430 via the connection line 420. The optical filter CF is directly attached to the photosensitive surface 410 at a side of the image sensor 40 facing the imaging lens 10, thereby preventing the photosensitive surface 410 from dust and moisture. The photosensitive surface 410 may be rectangular.

The side elastic elements 350b provide freedom of movement for the second frame 330 of the movable carrier 30b in the focusing direction D1, such that the second frame 330 can move relative to the holder 20 in the focusing direction D1. Moreover, the second frame 330 is in physical contact with the side elastic elements 350b, such that the corner drive mechanism 50 is electrically connected to the side elastic elements 350b via the routing inside the second frame 330.

The corner drive mechanism 50 is disposed corresponding to a corner of the photosensitive surface 410 of the image sensor 40. The corner drive mechanism 50 is, for example but not limited to, a VCM including a corner magnet 510 (drive magnet) and a corner coil 520 (drive coil), and the corner magnet 510 is disposed opposite to the corner coil 520. The corner magnet 510 is disposed on the magnet carrier 220 of the holder 20 so as to be fixed relative to the imaging lens 10, and the corner coil 520 is disposed on the second frame 330 of the movable carrier 30b. The side elastic element 350b of the movable carrier 30b may be a metallic spring leaf, and the corner coil 520 is electrically connected to the base 210 via the side elastic elements 350b.

The side drive mechanism 60 is disposed corresponding to a side of the photosensitive surface 410 of the image sensor 40, and the corner drive mechanism 50 is disposed adjacent to the side drive mechanism 60. The side drive mechanism 60 is, for example but not limited to, a VCM including a side magnet 610 (drive magnet) and a side coil 620 (drive coil), and the side magnet 610 is disposed opposite to the side coil 620. The side magnet 610 is disposed on the second frame 330 of the movable carrier 30b, and the side coil 620 is disposed on the first frame 320 of the movable carrier 30b. The direction of a magnetic field F1 of the corner magnet 510 is non-parallel to the direction of a magnetic field F2 of the side magnet 610.

The camera module 3 according to this embodiment further includes a maintainer 31 configured to maintain the position of the first frame 320 on the second frame 330 during focusing and translational movement, thereby improving movement stability.

The camera module 3 according to this embodiment includes a total of four corner drive mechanisms 50 and a total of four side drive mechanisms 60. Two of the corner drive mechanisms 50 which are non-adjacent may be arranged symmetrically about the optical axis CA, and two of the side drive mechanisms 60 which are non-adjacent may be arranged symmetrically about the optical axis CA.

Figure 22:
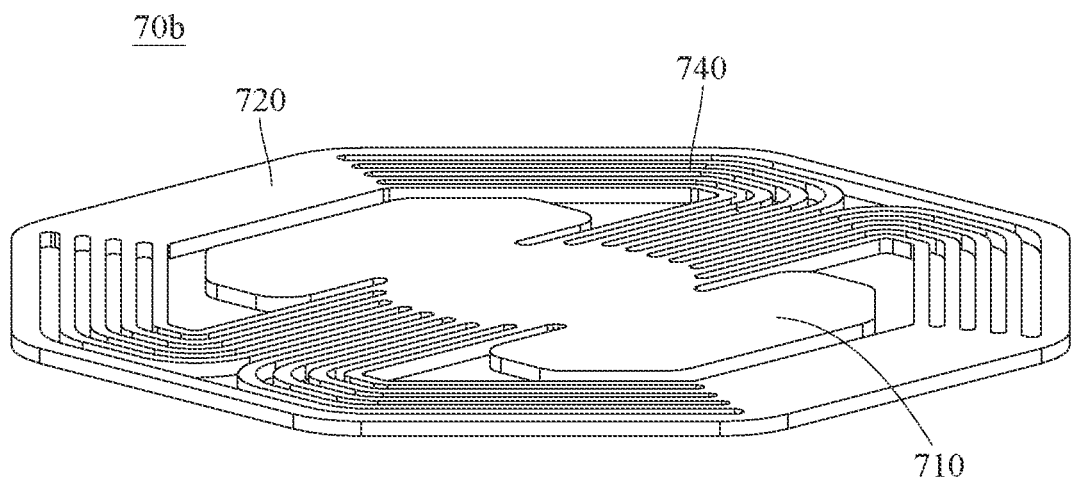
FIG. 22 is a perspective view of an electrical connection element of the camera module in FIG. 19.
Figure 23:
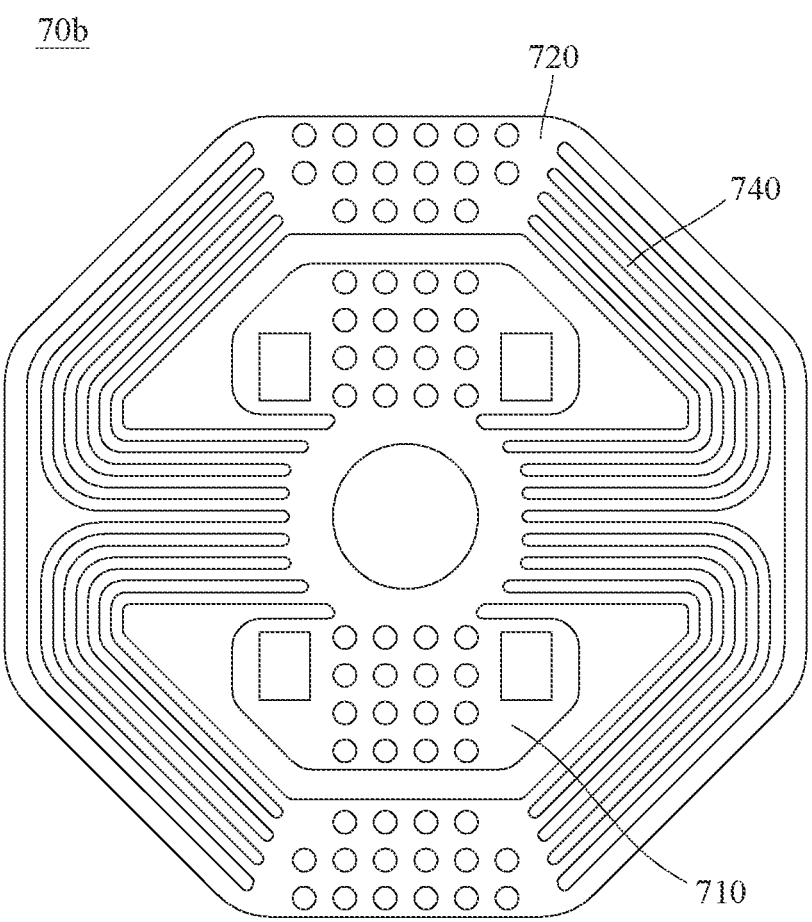
FIG. 23 is a top view of the electrical connection element in FIG. 22.

Please refer to FIG. 22 and FIG. 23. FIG. 22 is a perspective view of an electrical connection element of the camera module in FIG. 19, and FIG. 23 is a top view of the electrical connection element in FIG. 22. The electrical connection element 70b includes a first connection part 710, a second connection part 720 and a conductive part 740. The second connection part 720 can move relative to the first connection part 710 in the focusing direction D1 and the translational direction D2. The conductive part 740 is flexible, and the conductive part 740 connects the first connection part 710 to the second connection part 720. The conductive part 740 includes a plurality of conductive lines configured for the electrical connection between the first connection part 710 and the second connection part 720. The image sensor 40 is electrically connected to the electrical connection element 70b via the circuit board 430. The side coil 620 is electrically connected to the electrical connection element 70b via the circuit board 430 and the routing inside the first frame 320.

Figure 24:
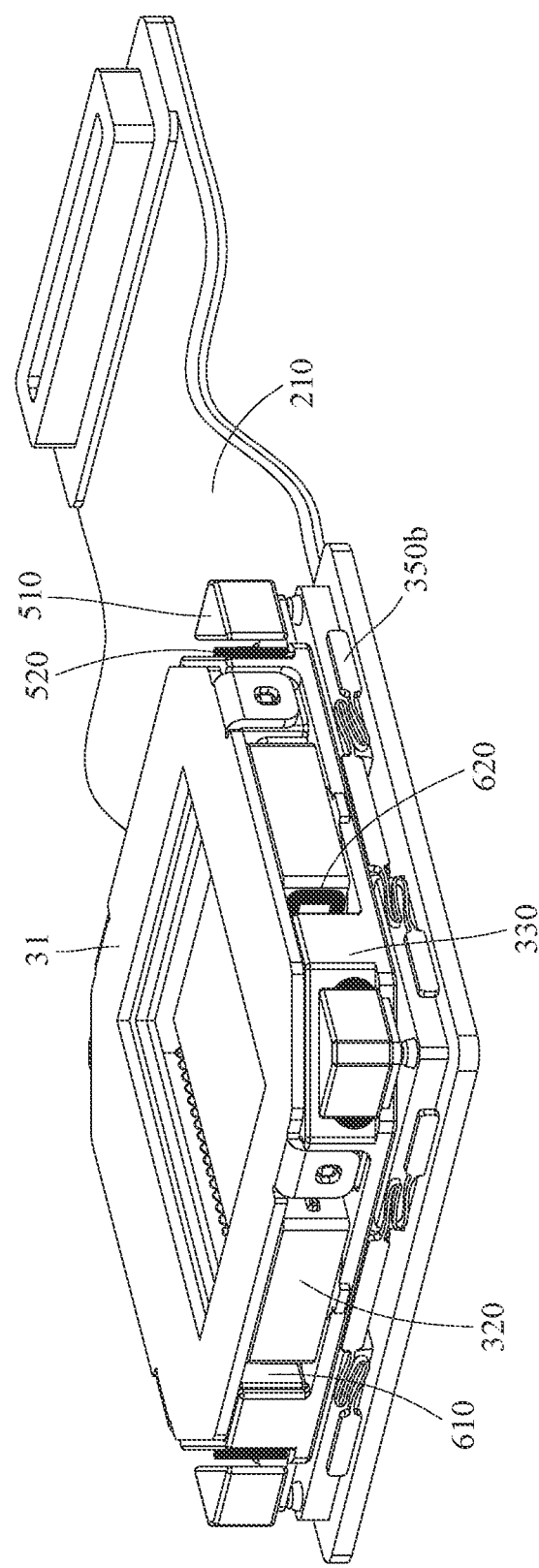
FIG. 24 is a perspective view of some elements of the camera module according to the 3rd embodiment of the present disclosure.
Figure 25:
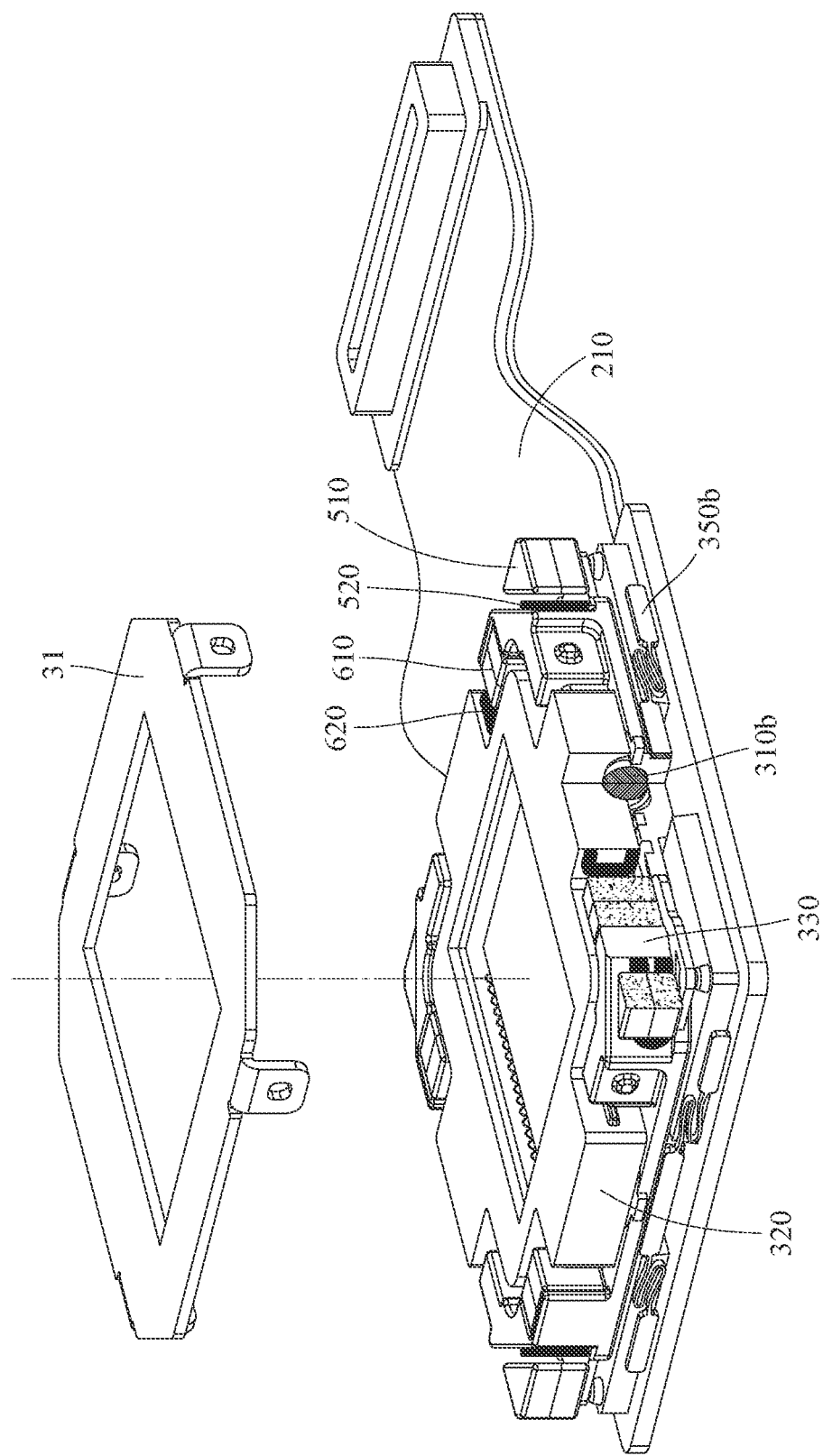
FIG. 25 is an exploded view of the elements of the camera module in FIG. 24.
Figure 26:
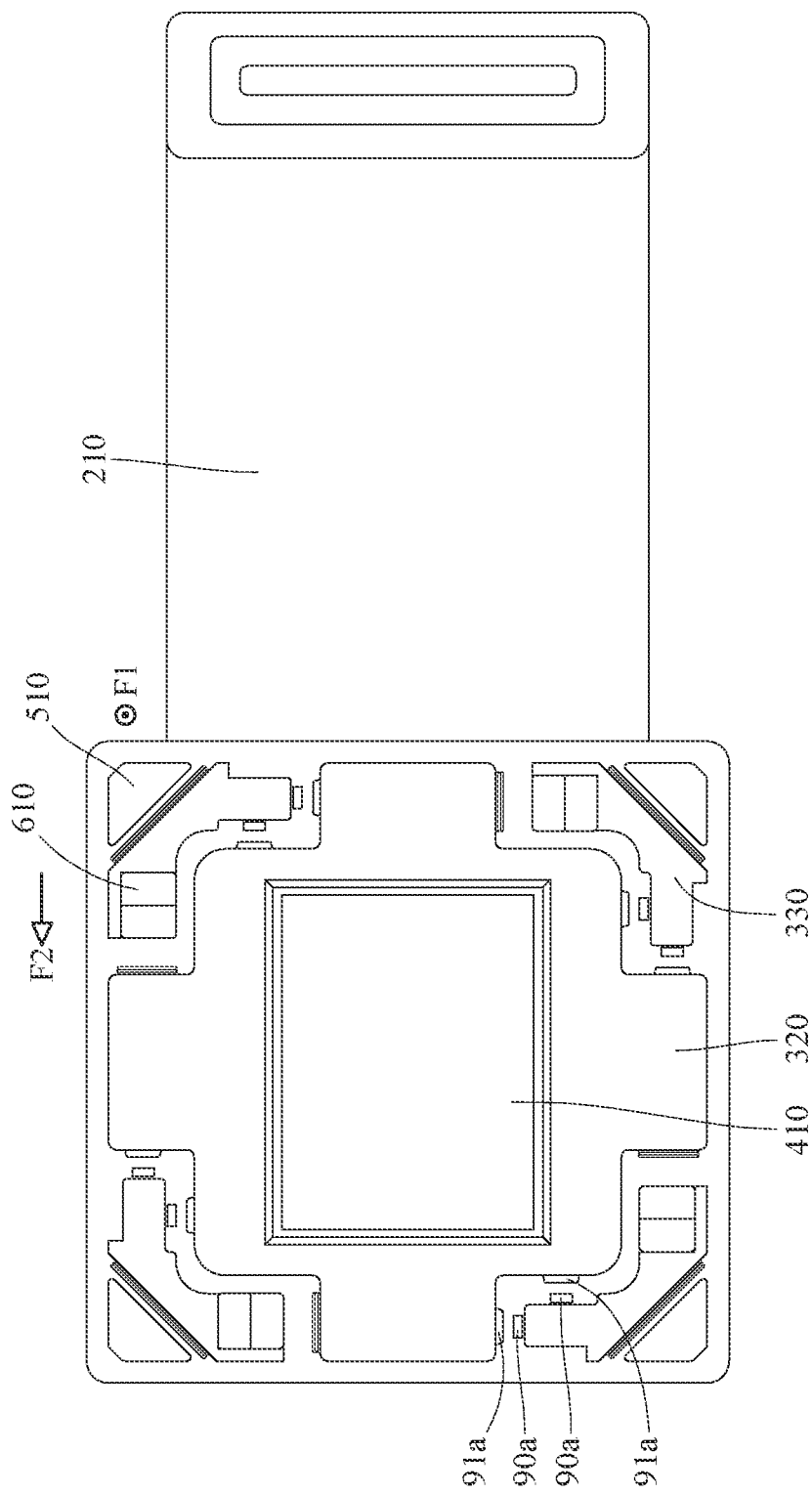
FIG. 26 is a top view of the elements of the camera module in FIG. 24.
Figure 27:
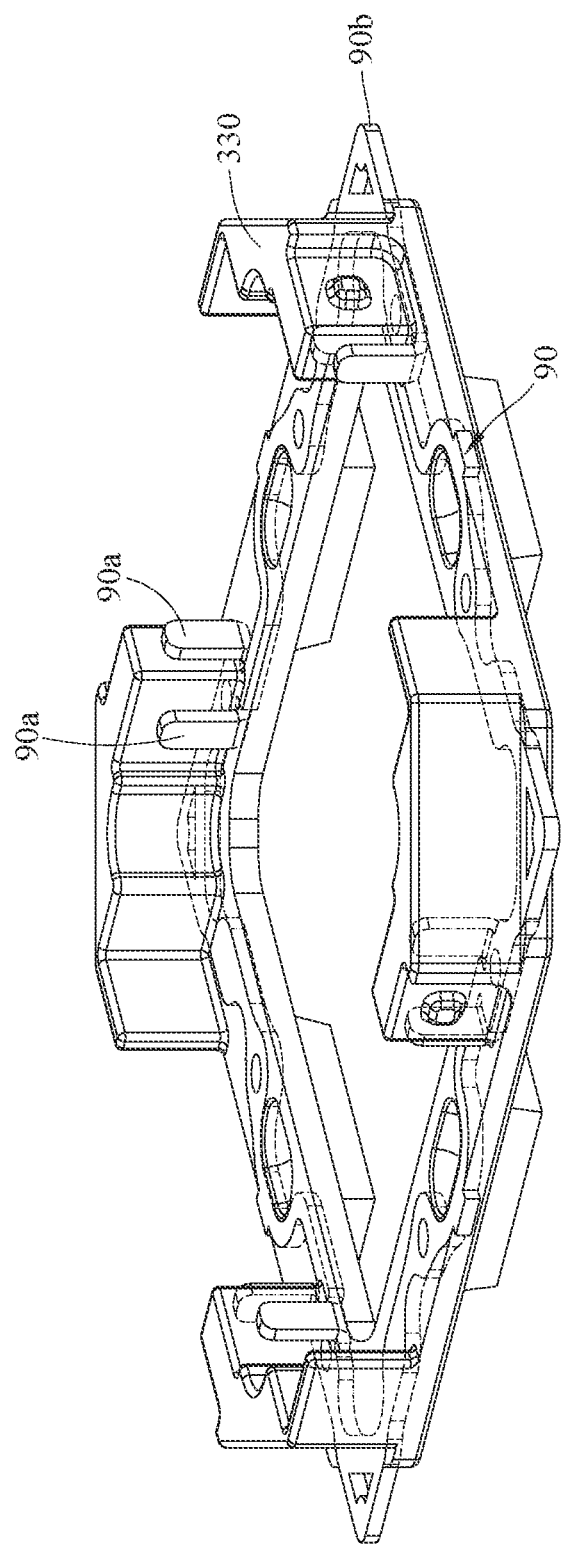
FIG. 27 through FIG. 32 are schematic views of an elastic protrusion structure and its counterpart of the camera module in FIG. 24.
Figure 28:
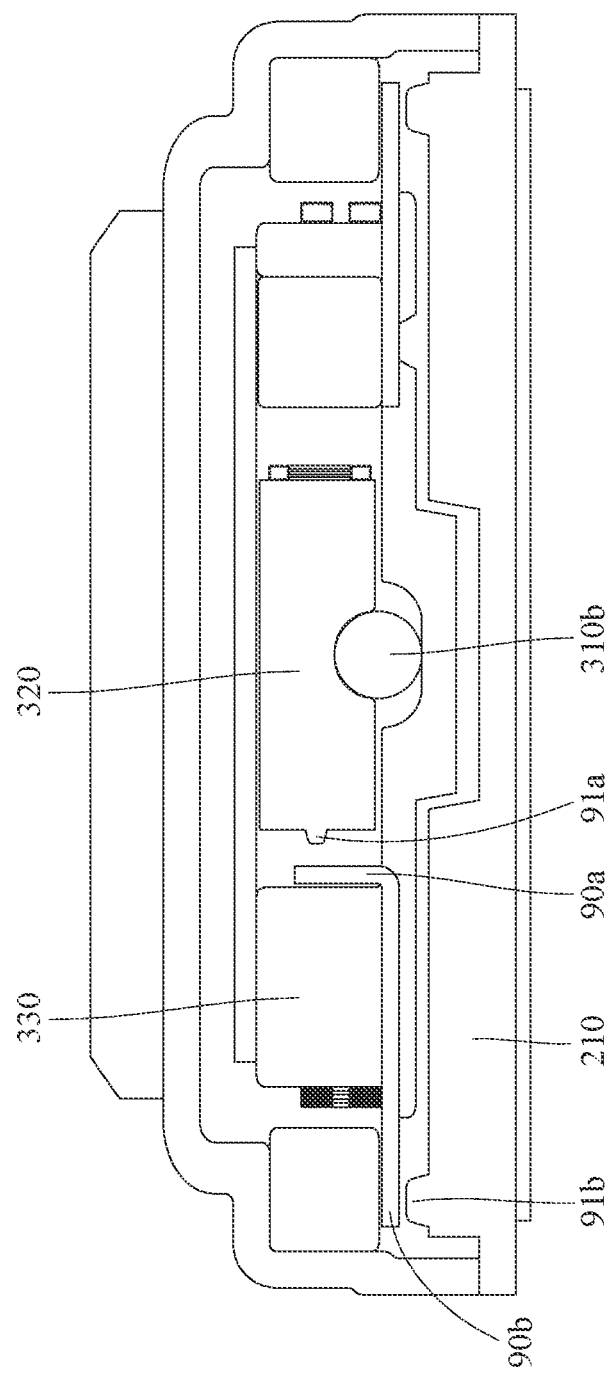

Please further refer to FIG. 24 through FIG. 32. FIG. 24 is a perspective view of some elements of the camera module according to the 3rd embodiment of the present disclosure, FIG. 25 is an exploded view of the elements of the camera module in FIG. 24, FIG. 26 is a top view of the elements of the camera module in FIG. 24, and FIG. 27 through FIG. 32 are schematic views of an elastic protrusion structure and its counterpart of the camera module in FIG. 24. The elastic protrusion structure is made of a metallic element 90, and the metallic element 90 is formed into one piece with the second frame 330 of the movable carrier 30b by insert molding. The elastic protrusion structure includes at least one elastic protrusion structure 90a for confining movement of the first frame 320 and an elastic protrusion structure 90b for confining movement of the second frame 330.

Also, the elastic protrusion structures 90a and 90b, the first frame 320 and the second frame 330 each includes a light absorbing surface facing the imaging lens 10. The light absorbing surface may be an anti-reflective coating AC on each surface of the elastic protrusion structures 90a and 90b, the first frame 320 and/or the second frame 330.

Figure 30:
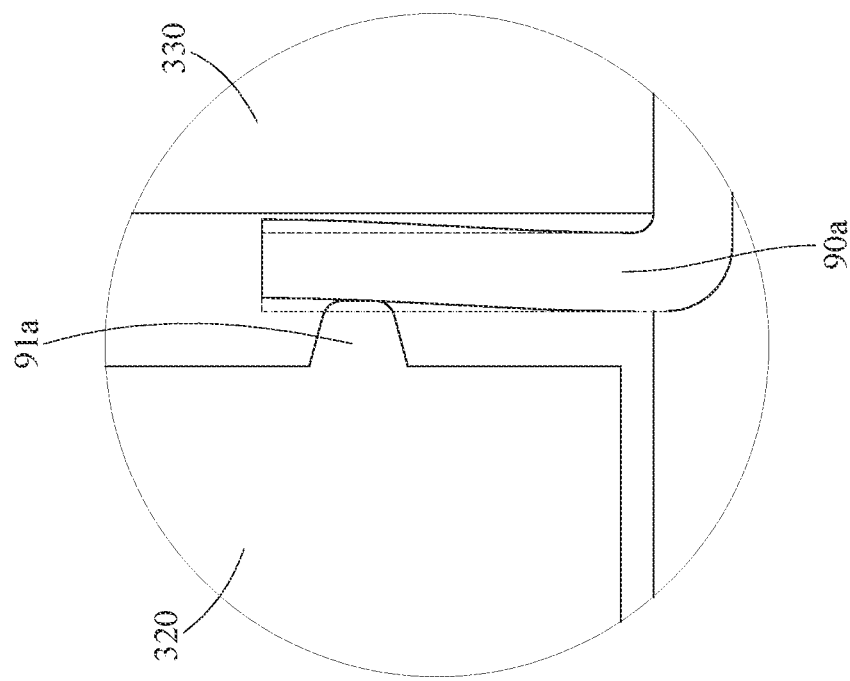
Figure 29:
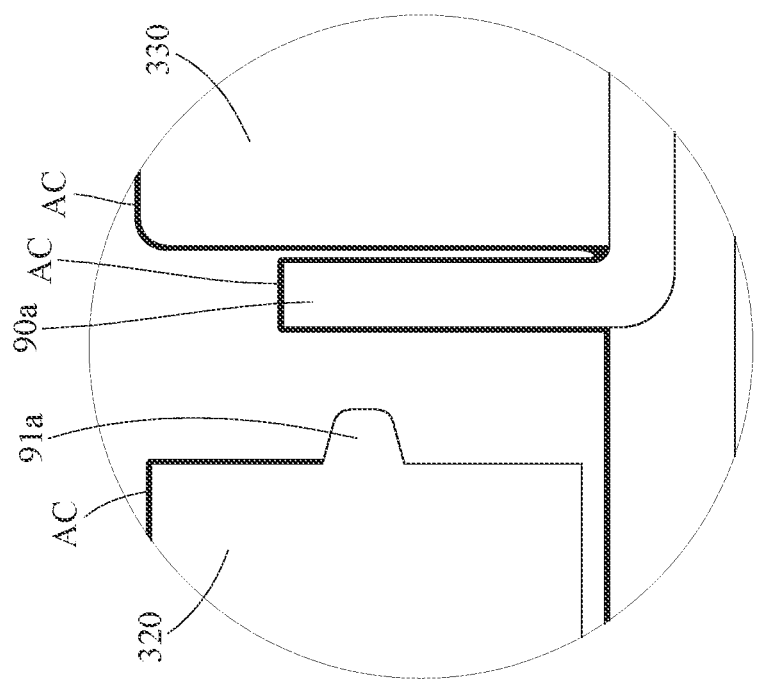
Figure 32:
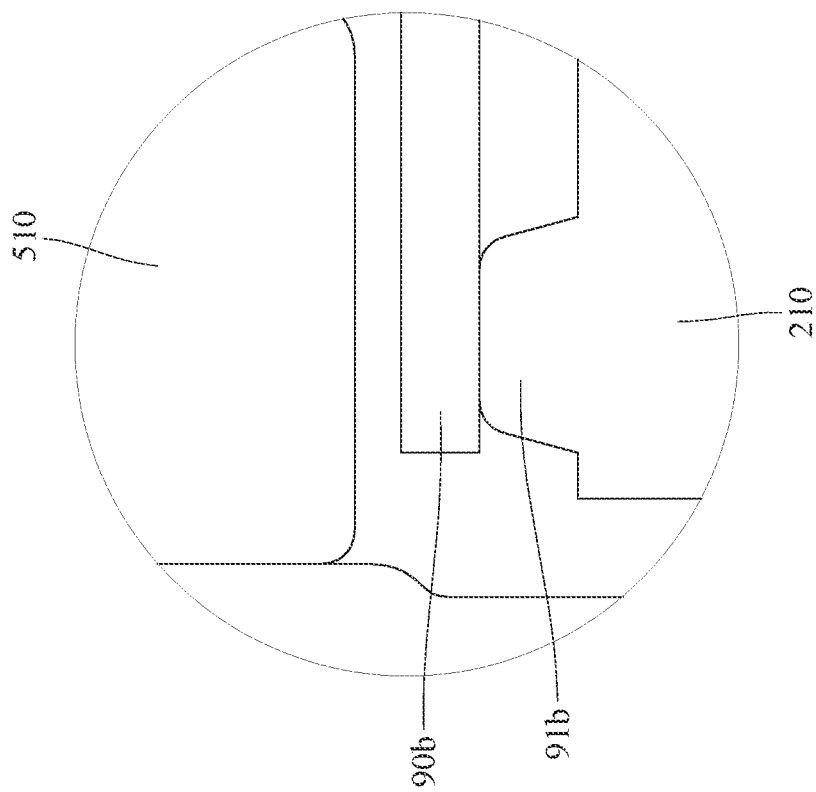
Figure 31:
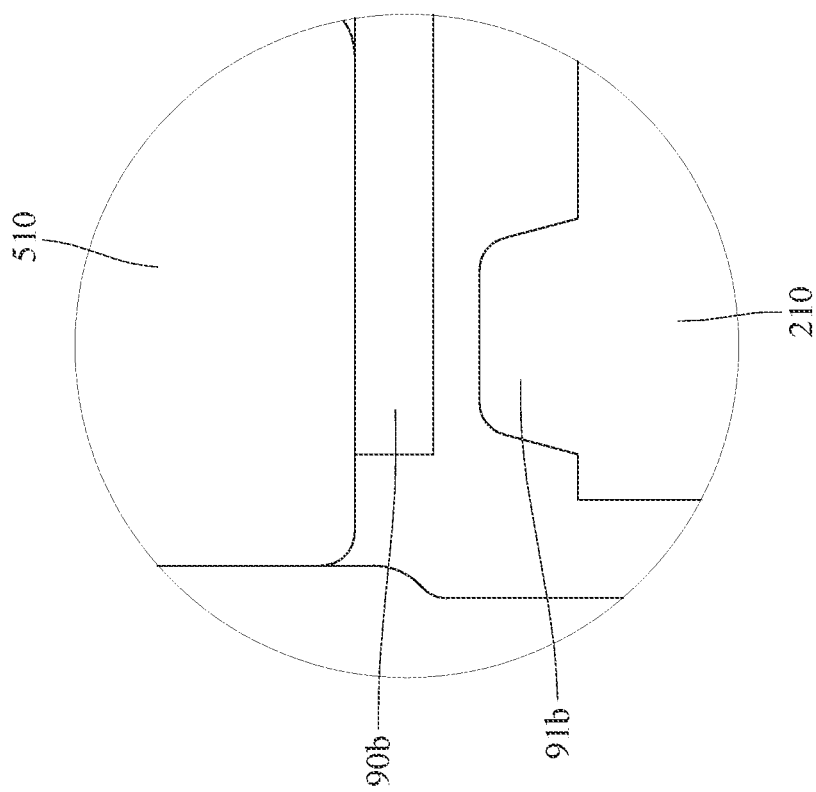

The elastic protrusion structure 90a can provide a collision reduction mechanism for the first frame 320 of movable carrier 30b in the translational direction D2. As shown in FIG. 29 and FIG. 30, when the first frame 320 is driven by the side drive mechanism 60 so as to move horizontally to reach its end of path, the elastic protrusion structure 90a abuts against a counterpart 91a formed on the first frame 320 so as to restrict the range of movement, thereby providing the cushion for reducing the collision. The elastic protrusion structure 90b can provide a collision reduction mechanism for the second frame 330 of the movable carrier 30b in the focusing direction D1. As shown in FIG. 31 and FIG. 32, when the second frame 330 is driven by the corner drive mechanism 50 so as to move vertically to reach its end of path, the elastic protrusion structure 90b abuts against a counterpart 91b formed on the base 210 or the corner magnet 510 so as to restrict the range of movement, thereby providing the cushion for reducing the collision. Moreover, the elastic protrusion structure 90a is movable only in the focusing direction D1.

Figure 33:
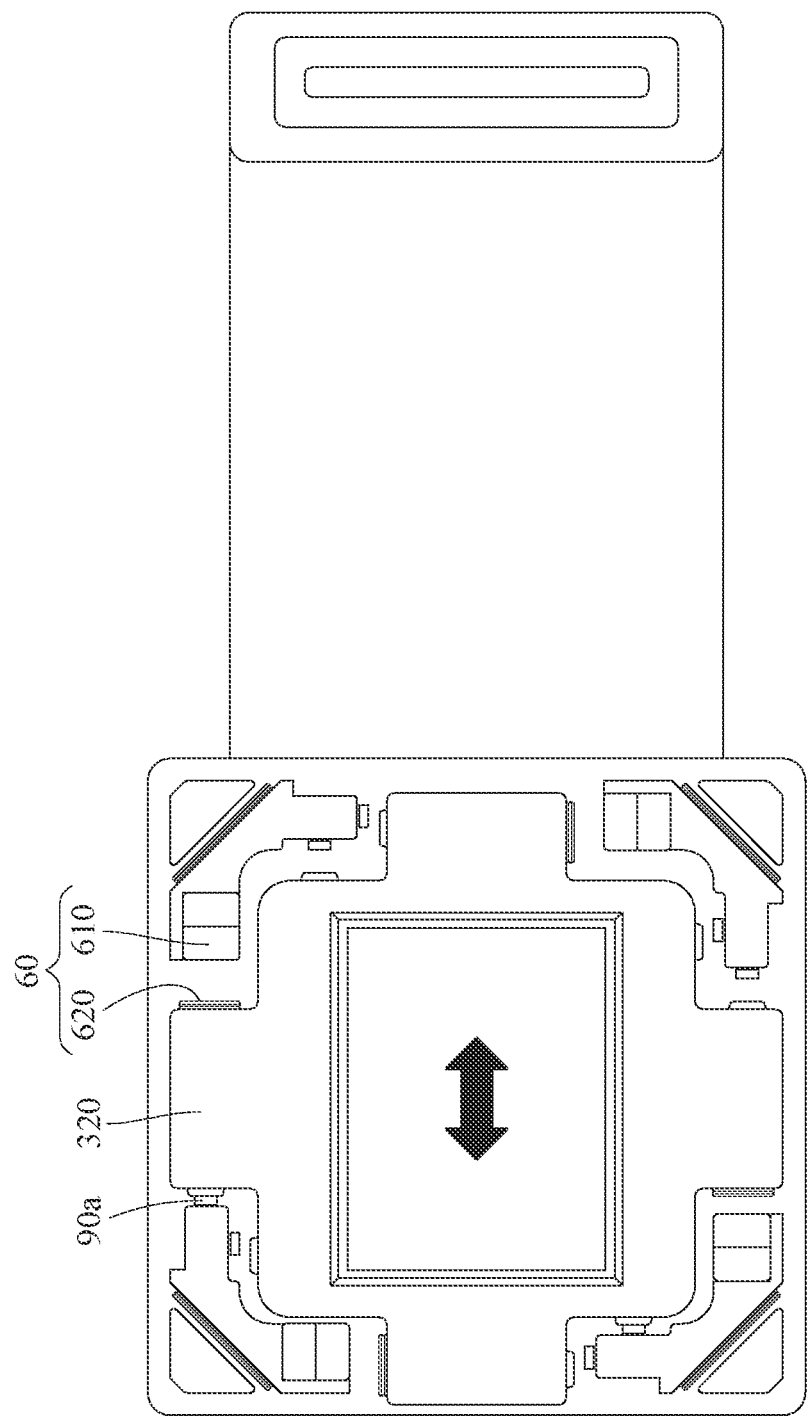
FIG. 33 through FIG. 35 are schematic views illustrating movement of the image sensor of the camera module according to the 3rd embodiment of the present disclosure.
Figure 34:
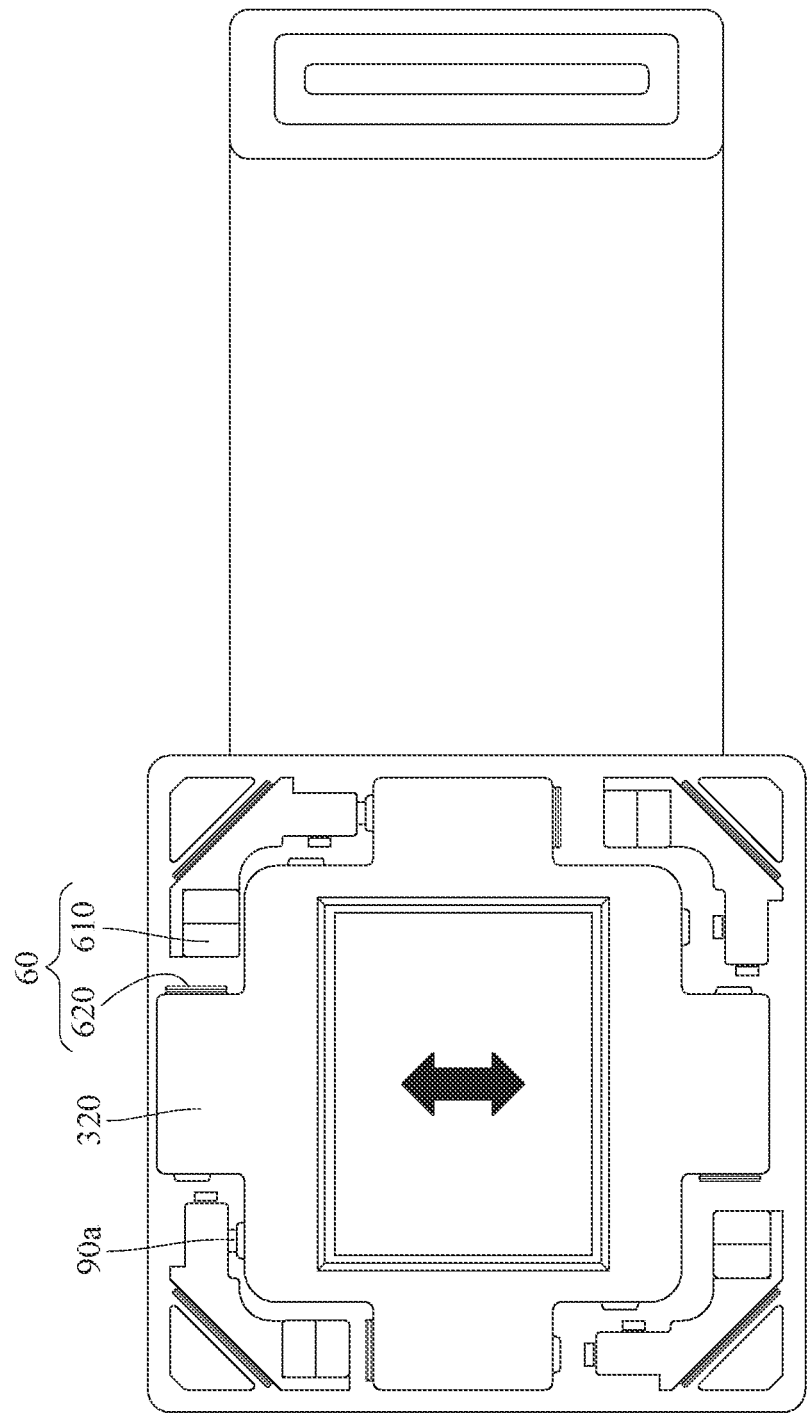
Figure 35:
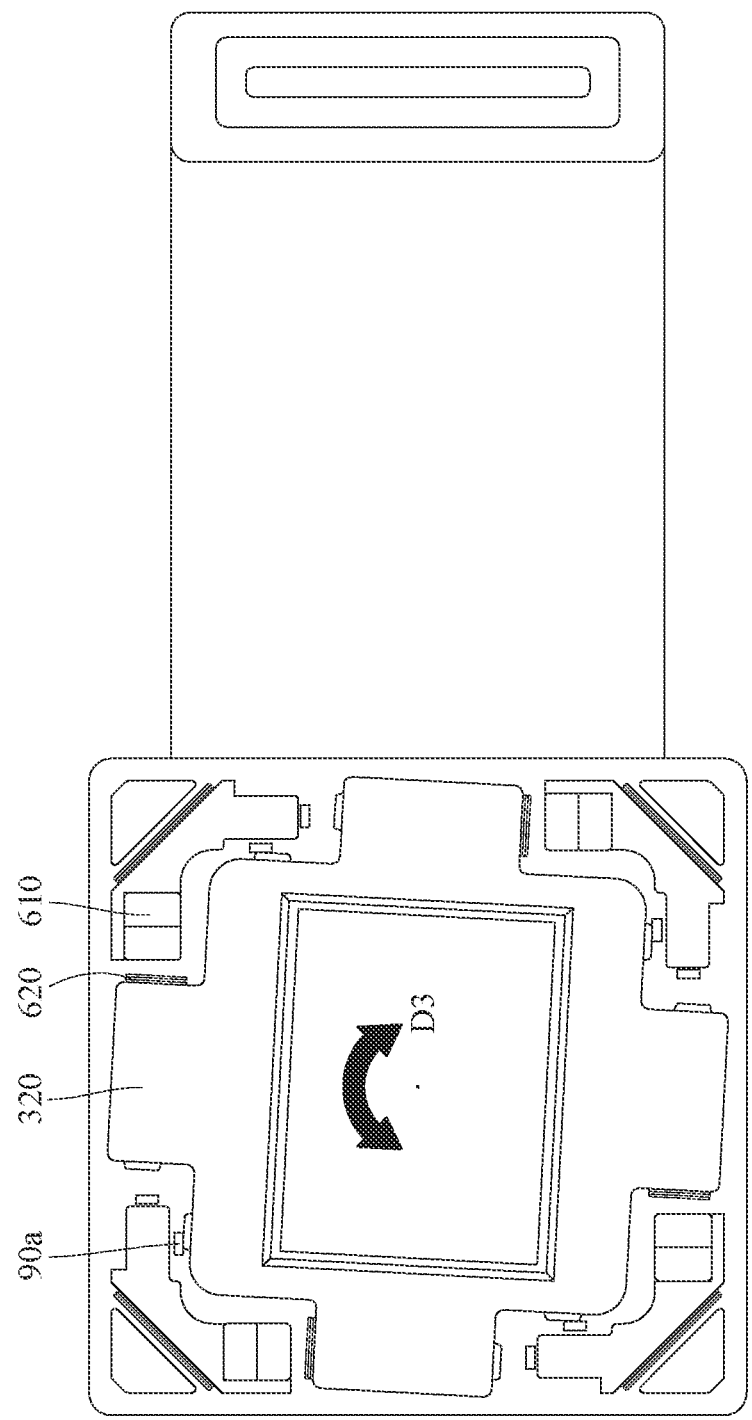

Furthermore, the side drive mechanism 60 drives the first frame 320, such that the image sensor 40 can rotate in a rotational direction D3 orthogonal to the focusing direction D1. FIG. 33 through FIG. 35 are schematic views illustrating movement of the image sensor of the camera module according to the 3rd embodiment of the present disclosure. FIG. 33 and FIG. 34 show a linear movement of the first frame 320 driven by the side drive mechanism 60. FIG. 35 shows a rotation of the first frame 320 driven by the side drive mechanism 60. The elastic protrusion structure 90a provides a collision reduction mechanism for the first frame 320 of the movable carrier 30b in the rotational direction D3.

4th Embodiment

Figure 36:
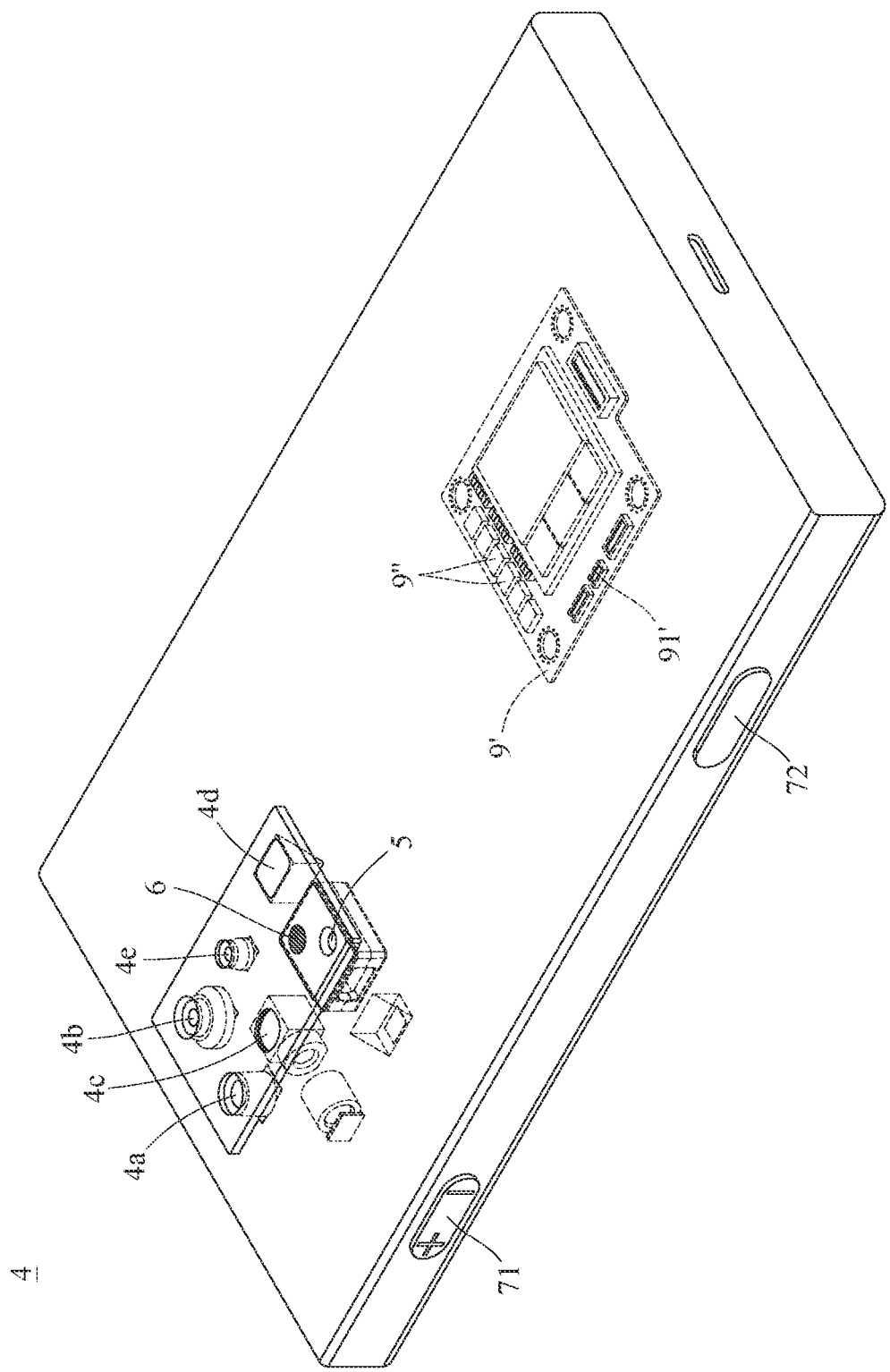
FIG. 36 is a perspective view of an electronic device according to the 4th embodiment of the present disclosure.
Figure 37:
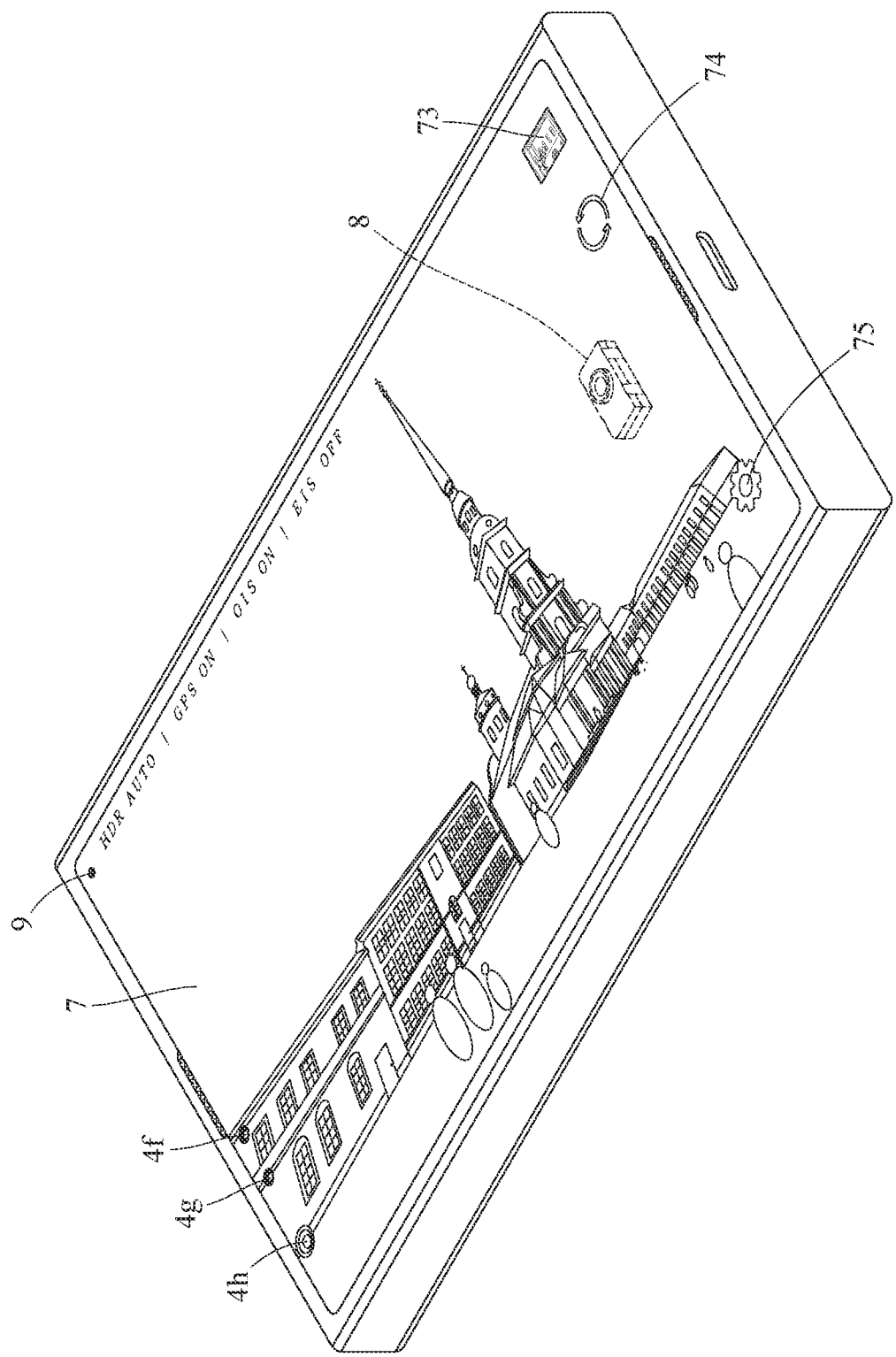
FIG. 37 is another perspective view of the electronic device in FIG. 36.
Figure 38:
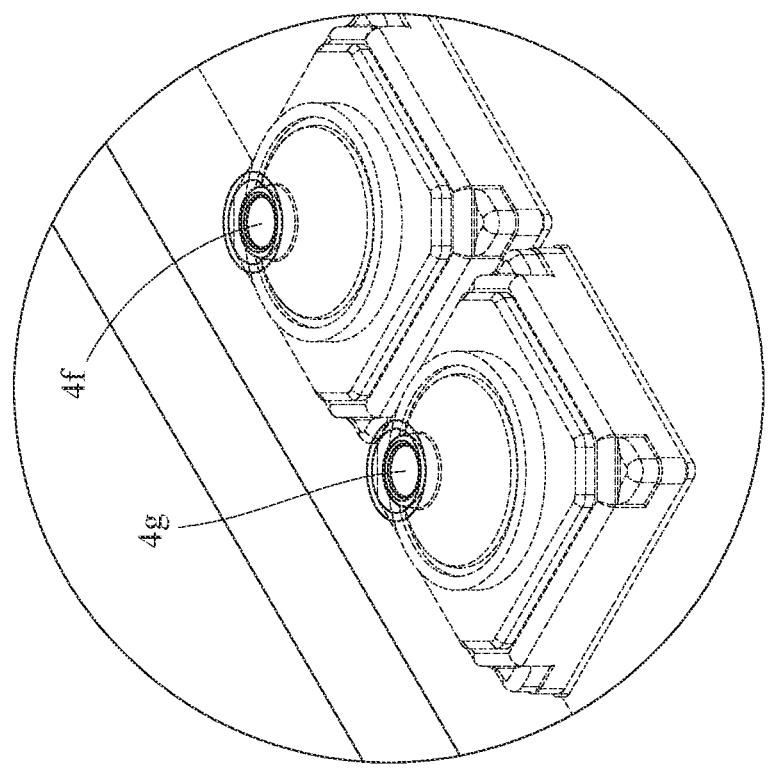
FIG. 38 is an enlarged view of the electronic device in FIG. 37.
Figure 39:
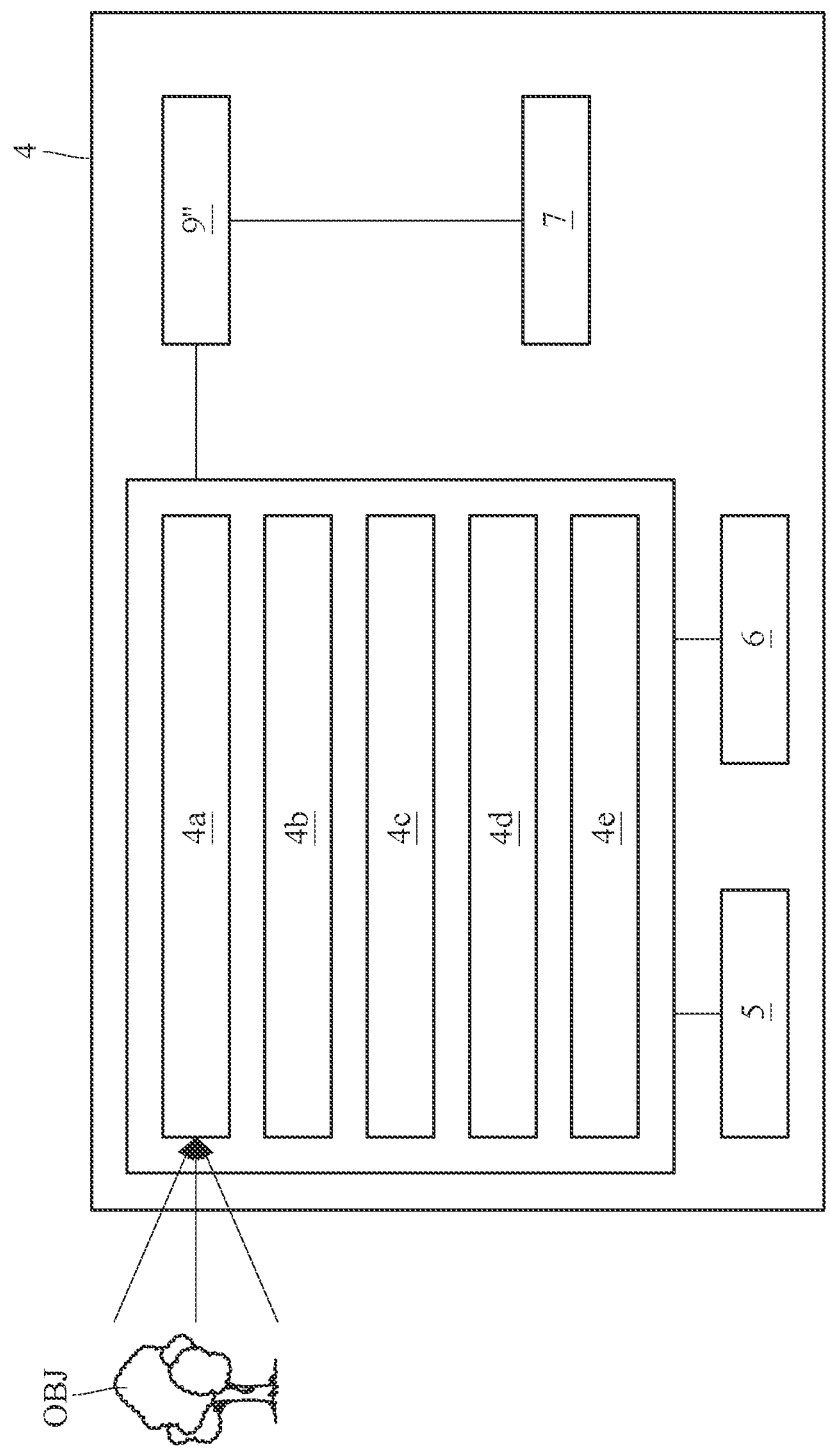
FIG. 39 is a block diagram of the electronic device in FIG. 36.

Please refer to FIG. 36 through FIG. 39. FIG. 36 is a perspective view of an electronic device according to the 4th embodiment of the present disclosure, FIG. 37 is another perspective view of the electronic device in FIG. 36, FIG. 38 is an enlarged view of the electronic device in FIG. 37, and FIG. 39 is a block diagram of the electronic device in FIG. 36.

In this embodiment, an electronic device 4 is a mobile device such as a computer, a smartphone, a smart wearable device, an aerial camera, a driving recorder and displayer, and the present disclosure is not limited thereto. The electronic device 4 includes an ultra-wide-angle camera module 4a, a wide-angle camera module 4b, a telephoto camera module 4c, an ultra-telephoto camera module 4d, a macrophoto camera module 4e, an ultra-wide-angle camera module 4f, a wide-angle camera module 4g, a ToF (time of flight) camera module 4h, a flash module 5, a focus assist module 6, an image signal processor (not numbered), a display module 7, an image software processor (not numbered) and a biometric identification device 8. Each of the camera modules 4a, 4b, 4c, 4d, 4e, 4f and 4g may be the camera module 1 as disclosed in the 1st embodiment, but the present disclosure is not limited thereto.

The camera module 4a, the camera module 4b, the camera module 4c, the camera module 4d and the camera module 4e are disposed on the same side of the electronic device electronic device 4. The camera modules 4f and 4g, the ToF camera module 4h and the display module 7 are disposed on the opposite side of the electronic device electronic device 4. The display module 7 can be a user interface, such that the camera module 4f and the camera module 4g can be front-facing cameras of the electronic device 4 for taking selfies, but the present disclosure is not limited thereto.

Figure 40:
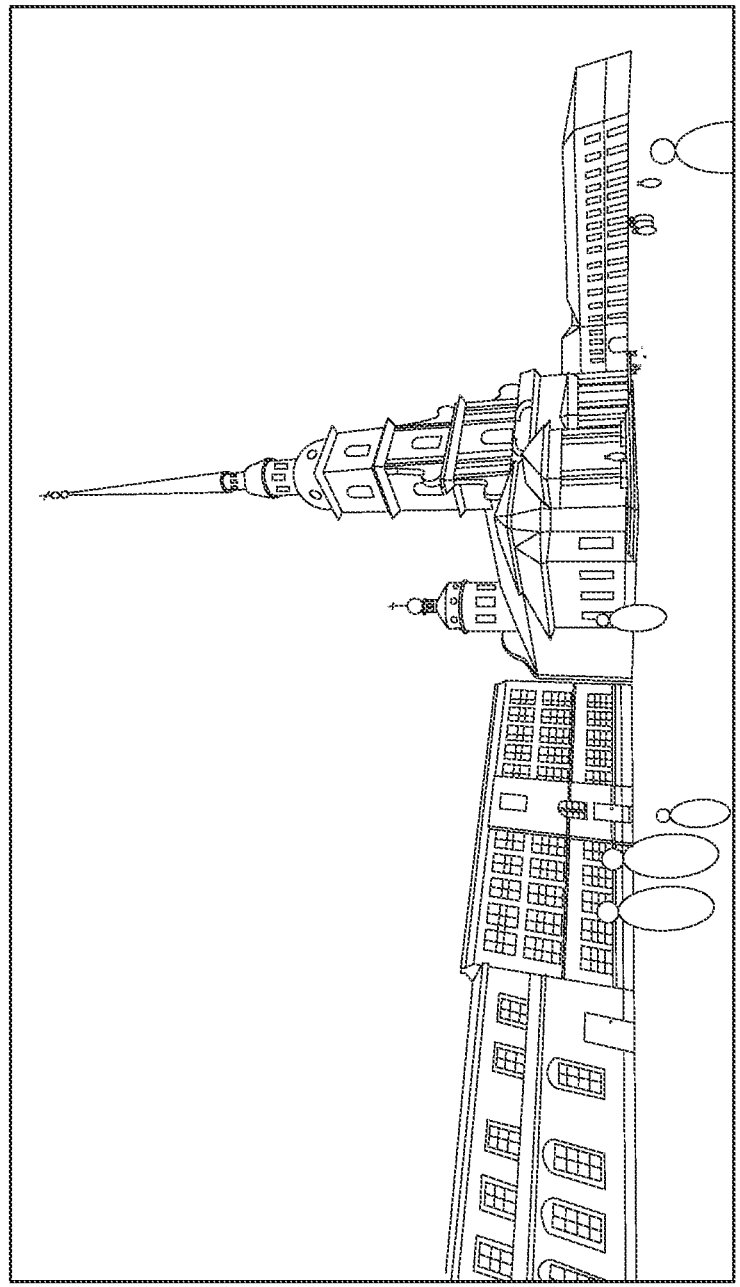
FIG. 40 shows an image captured by the electronic device using an ultra-wide-angle camera module in FIG. 36.
Figure 41:
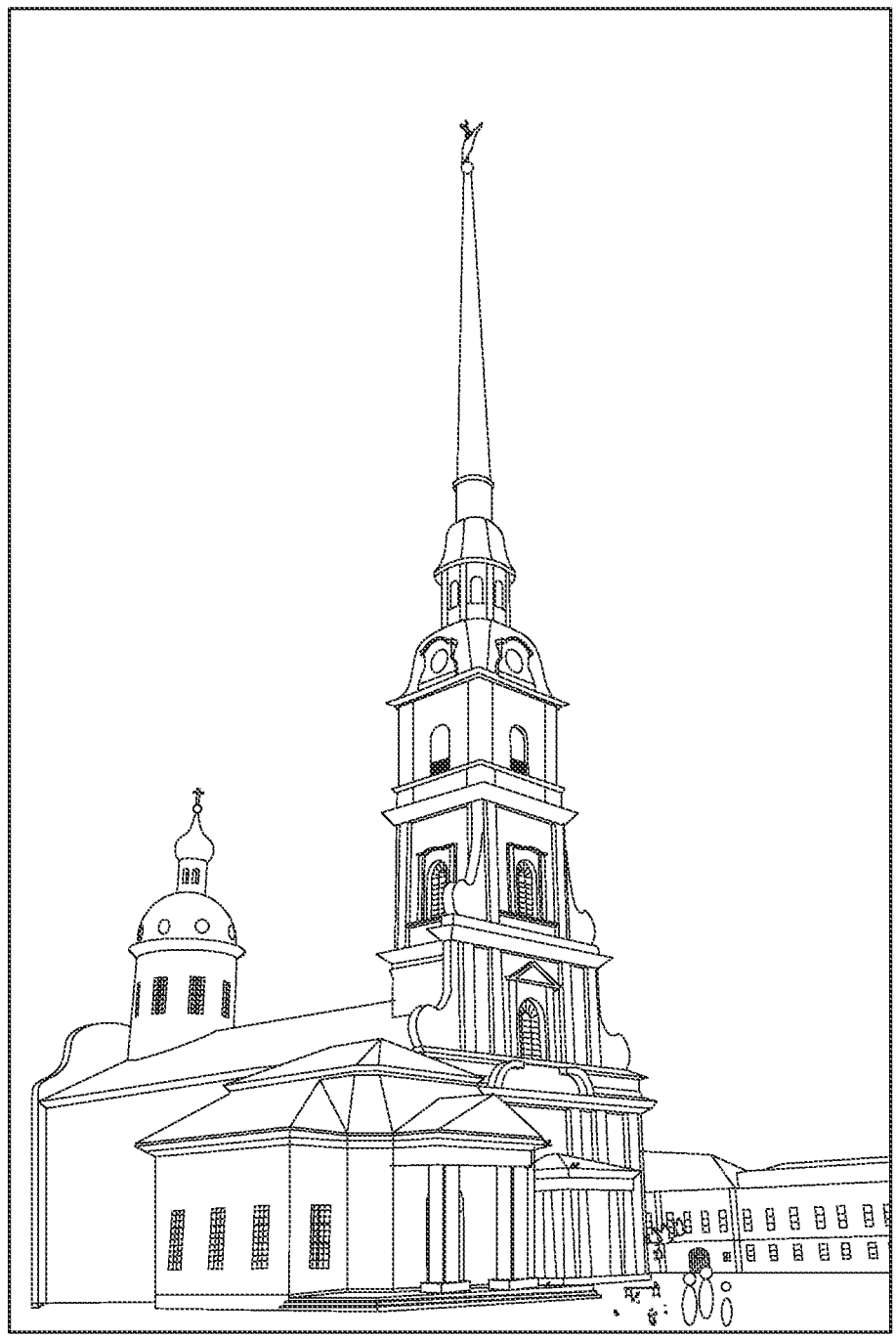
FIG. 41 shows an image captured by the electronic device using a wide-angle camera module in FIG. 36.
Figure 42:
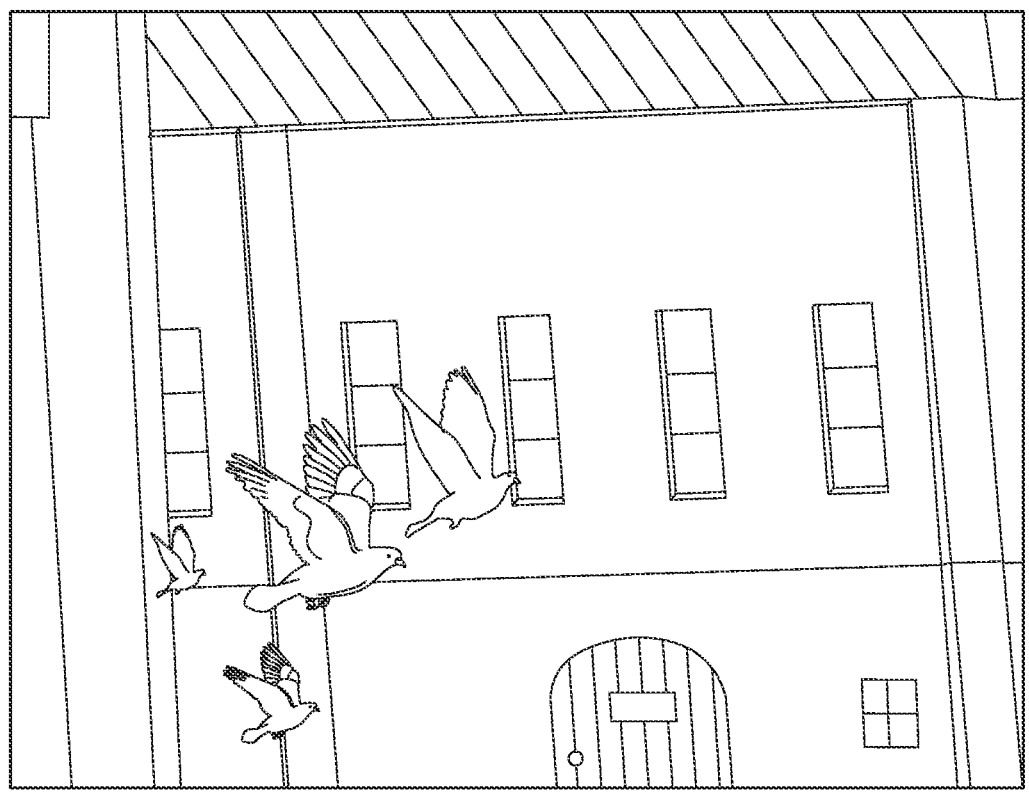
FIG. 42 shows an image captured by the electronic device using a telephoto camera module in FIG. 36.
Figure 43:
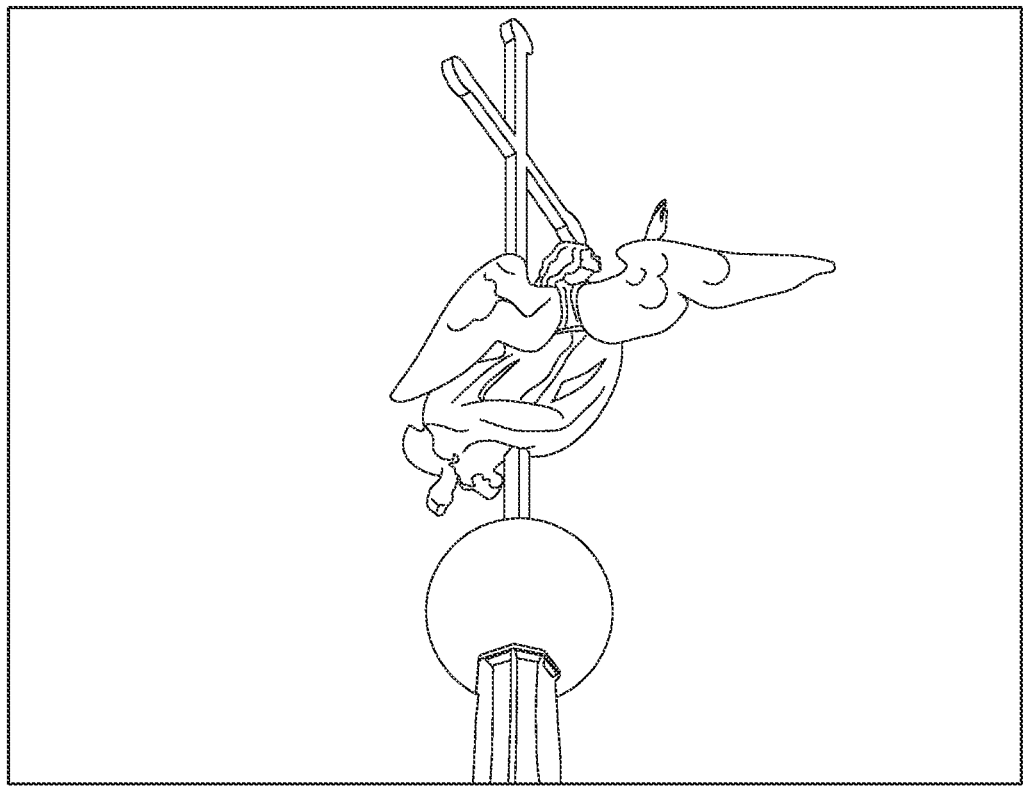
FIG. 43 shows an image captured by the electronic device using an ultra-telephoto camera module in FIG. 36.

In this embodiment, the camera module 4a, the camera module 4b, the camera module 4c and the camera module 4d have different fields of view, such that the electronic device 4 can have various magnification ratios so as to meet the requirement of optical zoom functionality. For example, the ultra-wide-angle camera module 4a has the largest field of view, and the image captured by the ultra-wide-angle camera module 4a can refer to FIG. 40 in which the display module 7 shows an image including the whole cathedral, surrounding buildings and people in front of the cathedral. The wide-angle camera 4b has a relatively large field of view, and the image captured by the wide-angle camera module 4b can refer to FIG. 41. The telephoto camera module 4c has a relatively small field of view, and the image captured by the telephoto camera module 4c can refer to FIG. 42. The ultra-telephoto camera module 4d has the smallest field of view, and the image captured by the ultra-telephoto camera module 4d can refer to FIG. 43. In addition, the ToF camera module 4h can determine depth information of the imaged object. In this embodiment, the electronic device 4 includes multiple camera modules 4a, 4b, 4c, 4d, 4e, 4f and 4g, but the present disclosure is not limited to the number and arrangement of camera modules.

When a user captures images of an object OBJ, light rays converge in the camera module 4a, 4b, 4c, 4d or 4e to generate images, and the flash module 5 is activated for light supplement. The focus assist module 6 detects the object distance of the imaged object OBJ to achieve fast auto focusing. The image signal processor is configured to optimize the captured image to improve image quality. The light beam emitted from the focus assist module 6 can be either conventional infrared or laser.

In addition, the light rays may converge in the camera module 4f or the camera module 4g to generate images. The electronic device 4 may include a light reminder 9 that can be illuminated to remind the user that the camera module 4f or the camera module 4g is working. The display module 7 can use a touch screen or physical buttons such as a zoom button 71 and a shutter release button 72. The user is able to interact with the display module 7 and the image software processor having multiple functions to capture images and complete image processing. The image processed by the image software processor can be displayed on the display module 7. The user can replay the previously captured image through an image playback button 73 of the display module 7, can choose a suitable camera module for shooting through a camera module switching button 74 of the display module 7, and can properly adjust shooting parameters according to current shooting situations through an integrated menu button 75 of the display module 7.

Further, the electronic device 4 further includes a circuit board 9', and the circuit board 9' carries a plurality of electronic components 9". The camera modules 4a, 4b, 4c, 4d, 4e, 4f and 4g are electrically connected to the electronic components 9" via connectors 91' on the circuit board 9'. The electronic components 9" can include a signal emitting module and can transmit image(s) to other electronic device or a cloud storage via the signal emitting module. The signal emitting module can be a wireless fidelity (WiFi) module, a Bluetooth module, an infrared module, a network service module or an integrated module for transmitting various signals mentioned above, and the present disclosure is not limited thereto.

The electronic components 9" can also include a storage unit, a random access memory for storing image information, a gyroscope, and a position locator for facilitating the navigation or positioning of the electronic device 4. In this embodiment, the electronic components 9" can be integrated into a single chip system, but the present disclosure is not limited thereto. In some other embodiments, the electronic components can also be integrated in the camera module or can also be disposed on one of the circuit boards. In addition, the user can use the biometric identification device 8 to turn on and unlock the electronic device 4.

The smartphone in this embodiment is only exemplary for showing the camera modules of the present disclosure installed in the electronic device 4, and the present disclosure is not limited thereto. The camera modules can be optionally applied to optical systems with a movable focus. Furthermore, the camera modules feature good capability in aberration corrections and high image quality, and can be applied to 3D (three-dimensional) image capturing applications, in products such as digital cameras, mobile devices, digital tablets, smart televisions, network surveillance devices, dashboard cameras, vehicle backup cameras, multi-camera devices, image recognition systems, motion sensing input devices, wearable devices and other electronic imaging devices.

The foregoing description, for the purpose of explanation, has been described with reference to specific embodiments. It is to be noted that the present disclosure shows different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. A camera module, comprising:
   an imaging lens;
   a movable carrier;
   an image sensor disposed on the movable carrier and at an image side of the imaging lens, wherein the image sensor comprises a photosensitive surface, the photosensitive surface faces the imaging lens, the photosensitive surface is substantially rectangular, and the image sensor comprising the photosensitive surface is movable close to or away from the imaging lens in a focusing direction and is movable in a translational direction orthogonal to the focusing direction;
   an elastic protrusion structure providing a collision reduction mechanism for the movable carrier in at least one of the focusing direction and the translational direction, wherein the elastic protrusion structure is made of a metallic element, and the metallic element and the movable carrier are formed into one piece by insert molding;
   a corner drive mechanism disposed corresponding to a corner of the photosensitive surface; and
   a side drive mechanism disposed corresponding to a side of the photosensitive surface;
   wherein one of the corner drive mechanism and the side drive mechanism drives the image sensor to move in the focusing direction, and another one thereof drives the image sensor to move in the translational direction.

2. The camera module according to claim 1, further comprising an electrical connection element, wherein the electrical connection element is electrically connected to the image sensor, and the electrical connection element comprises:
   a first connection part;
   a second connection part opposite to the first connection part, wherein the second connection part is movable in at least one of the focusing direction and the translational direction; and
   a conductive part connecting the first connection part to the second connection part, wherein the conductive part comprises a plurality of conductive lines configured for electrical connection between the first connection part and the second connection part.

3. The camera module according to claim 2, wherein the first connection part is fixed relative to the imaging lens.

4. The camera module according to claim 2, wherein one of the corner drive mechanism and the side drive mechanism is electrically connected to the electrical connection element.

5. The camera module according to claim 2, further comprising a position sensing element, wherein the position sensing element is configured to detect a position of the image sensor, and the position sensing element is electrically connected to the electrical connection element.

6. The camera module according to claim 1, wherein the corner drive mechanism is disposed adjacent to the side drive mechanism.

7. The camera module according to claim 1, wherein the corner drive mechanism comprises a drive magnet and a drive coil, the drive magnet and the drive coil are disposed opposite to each other, and one of the drive magnet and the drive coil is fixed relative to the imaging lens.

8. The camera module according to claim 1, wherein the side drive mechanism comprises a drive magnet and a drive coil, the drive magnet and the drive coil are disposed opposite to each other, and one of the drive magnet and the drive coil is fixed relative to the imaging lens.

9. The camera module according to claim 1, wherein each of the corner drive mechanism and the side drive mechanism is a voice coil motor, the corner drive mechanism comprises a corner magnet, the side drive mechanism comprises a side magnet, and a direction of a magnetic axis of the corner magnet is non-parallel to a direction of a magnetic axis of the side magnet.

10. The camera module according to claim 1, wherein each of the corner drive mechanism and the side drive mechanism is a voice coil motor, the corner drive mechanism comprises a corner coil, the side drive mechanism comprises a side coil, and the corner coil and the side coil are disposed on a same circuit element.

11. The camera module according to claim 1, wherein the movable carrier comprises a support element, the support element provides support for the movable carrier in the focusing direction, and the support element provides freedom of movement for the movable carrier in the translational direction.

12. The camera module according to claim 11, wherein the support element is electrically connected to one of the corner drive mechanism and the side drive mechanism.

13. The camera module according to claim 11, wherein the support element is a rollable element.

14. The camera module according to claim 1, wherein the movable carrier comprises an elastic element, the elastic element provides freedom of movement for the movable carrier in the focusing direction.

15. The camera module according to claim 14, wherein the elastic element is electrically connected to one of the corner drive mechanism and the side drive mechanism.

16. The camera module according to claim 1, wherein the movable carrier comprises a light absorbing surface facing the imaging lens.

17. The camera module according to claim 1, wherein a number of the corner drive mechanism is two, and the two corner drive mechanisms are provided symmetrically.

18. The camera module according to claim 1, wherein a number of the side drive mechanism is two, and the two side drive mechanisms are provided symmetrically.

19. The camera module according to claim 1, wherein one of the corner drive mechanism and the side drive mechanism drives the image sensor to rotate in a rotational direction orthogonal to the focusing direction.

20. An electronic device, comprising:
The camera module according to claim 1.

* * * * *